US012680808B2

(12) United States Patent
Hai Vidal et al.

(10) Patent No.: US 12,680,808 B2
(45) Date of Patent: Jul. 14, 2026

(54) METHOD AND APPARATUS FOR MAPPING AND RANGING BASED ON COHERENT-TIME COMPARISON

(71) Applicant: LIDWAVE LTD., Jerusalem (IL)

(72) Inventors: Yehuda Hai Vidal, Jerusalem (IL); Uri Weiss, Mevo Beitar (IL)

(73) Assignee: LIDWAVE LTD., Jerusalem (IL)

( * ) Notice: Subject to any disclaimer, the term of this patent is extended or adjusted under 35 U.S.C. 154(b) by 42 days.

(21) Appl. No.: 17/995,182

(22) PCT Filed: Mar. 25, 2021

(86) PCT No.: PCT/IL2021/050340
§ 371 (c)(1),
(2) Date: Sep. 30, 2022

(87) PCT Pub. No.: WO2021/199027
PCT Pub. Date: Oct. 7, 2021

(65) Prior Publication Data
US 2023/0160681 A1 May 25, 2023

(30) Foreign Application Priority Data

Apr. 2, 2020 (IL) .......................................... 273779

(51) Int. Cl.
*G01B 9/0209* (2022.01)
*G01B 9/02001* (2022.01)
(Continued)

(52) U.S. Cl.
CPC ..... *G01B 9/02004* (2013.01); *G01B 9/02009* (2013.01); *G01B 9/02027* (2013.01);
(Continued)

(58) Field of Classification Search
CPC ............ G01B 9/02004; G01B 9/02009; G01B 9/02027; G01B 9/02028; G01B 9/0209;
(Continued)

(56) References Cited

U.S. PATENT DOCUMENTS

| | | | | |
|---|---|---|---|---|
| 4,929,077 A | * | 5/1990 | Huisen ............... | G01B 9/02007 |
| | | | | 356/4.09 |
| 5,501,226 A | | 3/1996 | Petersen et al. | |

(Continued)

FOREIGN PATENT DOCUMENTS

| | | |
|---|---|---|
| CN | 108964778 A | 12/2018 |
| WO | 2019/234752 A1 | 12/2019 |
| WO | 2020025200 A1 | 2/2020 |

OTHER PUBLICATIONS

Hoonyol Lee and Jian Guo Liu, "Analysis of topographic decorrelation in SAR interferometry using ratio coherence imagery," in IEEE Transactions on Geoscience and Remote Sensing, vol. 39, No. 2, pp. 223-232, Feb. 2001, doi: 10.1109/36.905230 (Year: 2001).*

(Continued)

*Primary Examiner* — Kara E. Geisel
*Assistant Examiner* — Jonathon Cook
(74) *Attorney, Agent, or Firm* — Vorys, Sater, Seymour and Pease, LLP; Maryellen Feehery Hank

(57) ABSTRACT

Provided is a system for range detection including at least one beam source arrangement configured to provide illumination of certain coherence length, an optical arrangement, and a detection arrangement including at least one detector unit.

16 Claims, 11 Drawing Sheets

(51) Int. Cl.

| | | |
|---|---|---|
| *G01B 9/02004* | (2022.01) | |
| *G01B 9/02015* | (2022.01) | |
| *G01B 11/02* | (2006.01) | |
| *G01S 17/08* | (2006.01) | |

(52) U.S. Cl.

CPC ....... *G01B 9/02028* (2013.01); *G01B 9/0209* (2013.01); *G01B 11/026* (2013.01); *G01S 17/08* (2013.01)

(58) Field of Classification Search

CPC ............ G01B 9/02091; G01B 9/02057; G01B 11/026; G01S 17/08; G01C 3/08

See application file for complete search history.

(56) References Cited

U.S. PATENT DOCUMENTS

| | | | | |
|---|---|---|---|---|
| 6,441,888 | B1 * | 8/2002 | Azuma | ................... G01S 17/89 356/4.06 |
| 8,045,251 | B2 | 10/2011 | Muenter et al. | |
| 8,767,217 | B2 * | 7/2014 | Hajian | ............... G01B 9/02081 356/497 |
| 8,817,269 | B2 | 8/2014 | Tumlinson | |
| 9,400,169 | B2 | 7/2016 | Zhou | |
| 2002/0118905 | A1 | 8/2002 | Wu et al. | |
| 2004/0246490 | A1 | 12/2004 | Wang | |
| 2005/0219544 | A1 * | 10/2005 | Chan | .................... A61B 5/0066 356/497 |
| 2008/0093540 | A1 * | 4/2008 | Horimoto | ............ G01B 11/026 250/227.11 |
| 2008/0297806 | A1 * | 12/2008 | Motaghiannezam | ......................... G01B 9/02004 356/484 |
| 2010/0027024 | A1 | 2/2010 | Nebosis et al. | |
| 2010/0091265 | A1 | 4/2010 | Franz | |
| 2012/0084045 | A1 * | 4/2012 | Koshimizu | ........ G01B 11/0675 702/134 |
| 2012/0120404 | A1 | 5/2012 | Coffin | |
| 2014/0204389 | A1 * | 7/2014 | Mukoh | .............. G01B 9/02007 356/479 |
| 2015/0338202 | A1 | 11/2015 | Xiang et al. | |
| 2016/0076872 | A1 * | 3/2016 | Cheng | ................ G01B 9/02014 356/482 |
| 2016/0091299 | A1 * | 3/2016 | Smythe | .............. G01B 9/02038 356/489 |
| 2018/0188447 | A1 * | 7/2018 | Weirich | ............... G02B 6/2821 |
| 2018/0299255 | A1 | 10/2018 | Walecki et al. | |
| 2019/0011251 | A1 * | 1/2019 | Moeller | ............ G01B 11/0691 |
| 2020/0041249 | A1 | 2/2020 | Strebel | |
| 2023/0102868 | A1 * | 3/2023 | Nakamura | ......... G01B 9/02004 356/479 |

OTHER PUBLICATIONS

A.G.H. Podoleanu,9—Optical sources for optical coherence tomography (OCT), Editor(s): Helena Jelínková, in Woodhead Publishing Series in Electronic and Optical Materials, Lasers for Medical Applications, Woodhead Publishing, 2013, pp. 253-285, ISBN 9780857092373 (Year: 2013).*

Salamon,"Michelson and Fabry-Perot interferometers with light sources of Gaussian and Lorentzian spectral distribution", Acta Physica Academiae Scientiarum Hungaricae, 1974, 36: 269-286.

Komissarov, et al., "Partially coherent radar unties range resolution from bandwidth limitations", 2019, Nature Communications, 10: 1423. https://doi.org/10.1038/s41467-019-09380-x.

\* cited by examiner

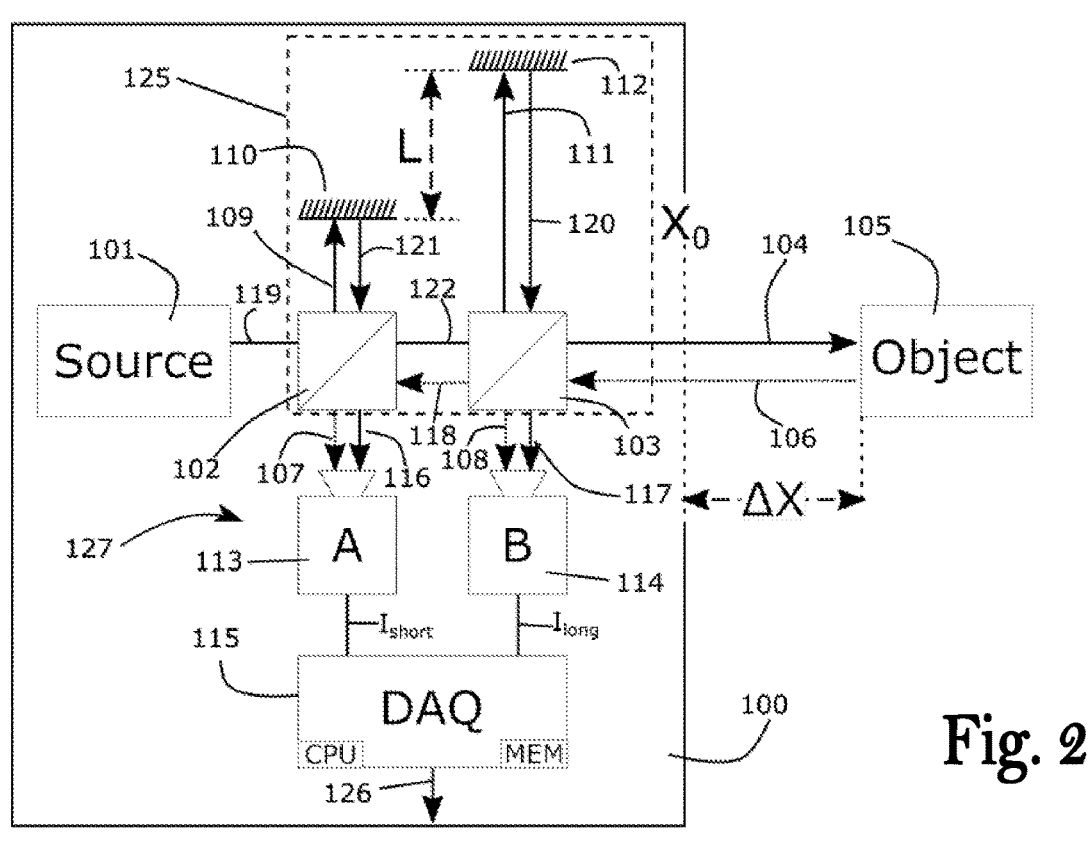
Fig. 2
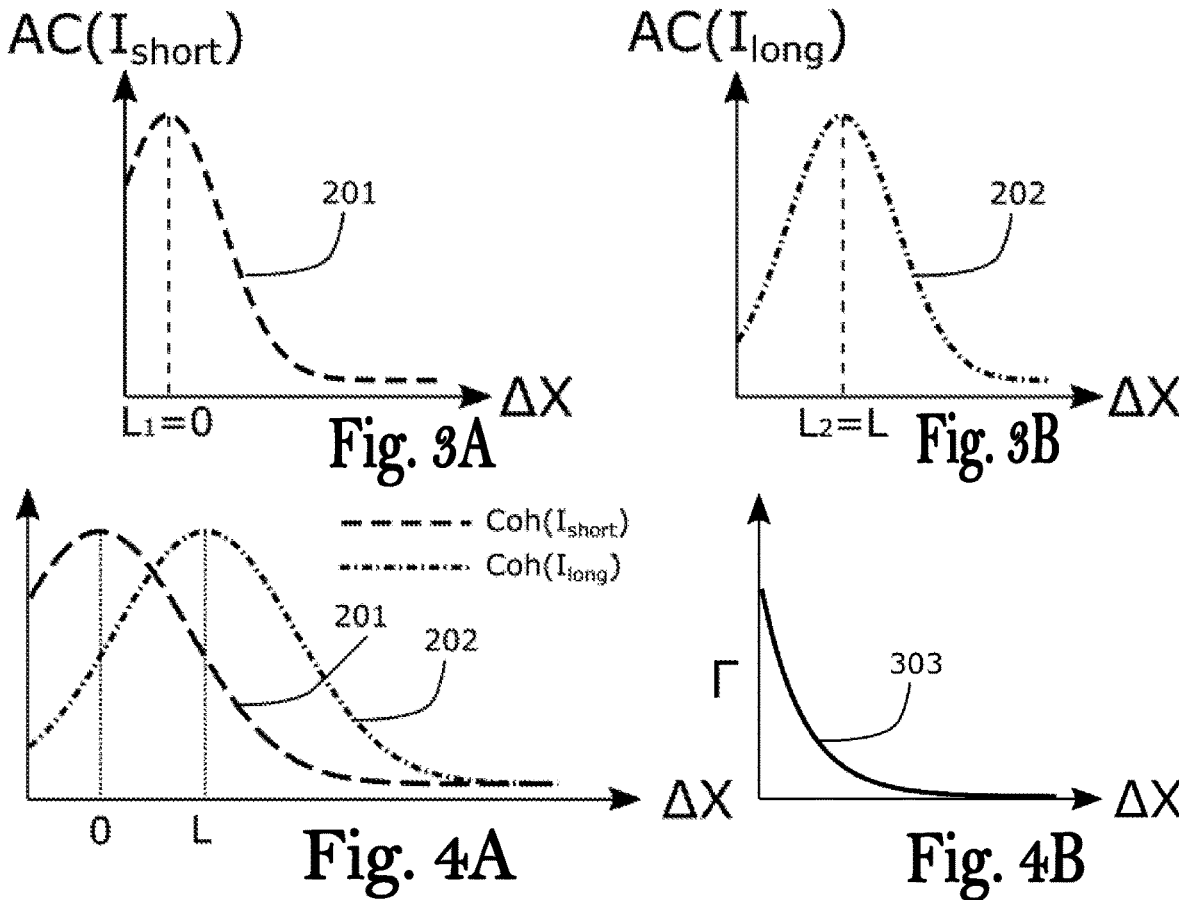
Fig. 3A          Fig. 3B
Fig. 4A          Fig. 4B

METHOD AND APPARATUS FOR MAPPING AND RANGING BASED ON COHERENT-TIME COMPARISON

TECHNOLOGICAL FIELD

The present invention is generally in the field of distance measurements using electromagnetic (EM) signals reflected from a target object, e.g., usable for 3D mapping and ranging for autonomous vehicles and airplanes, biological tissue imaging, and thin layer measurement in fabrication processes.

BACKGROUND

Accurately measuring the distance to an object plays a key role in many applications, such as navigation, object detection, biomedical research and operations, thin layer measurements, and more. Different methods and applications based on exploiting the electromagnetic radiation can be roughly divided into two groups—long and short distance measurements. For example, long-distance measurements including navigation and detection can be used for autonomous vehicles, and/or airplane, light detection and ranging (LiDAR) and/or RADAR, applications, while short distance measurements are usually used for biomedical operations and thin layer characterization.

There are well-known techniques for carrying out active distance measurement using electromagnetic waves—usually utilizing Radio Frequency (RF), optical, and infrared regime, signals. Some of these techniques exploit the fact that the propagation speed of electromagnetic radiation in free space is constant, for determining distance of a target object by measuring travel time of electromagnetic signals reflected from the target, while other related techniques use white light, or broadband source interferometry, exploiting short coherence length to measure distance by means of zero Optical Path Difference (OPD).

The former techniques are usually used for long-distance measurements, while the latter techniques are usually used for short-distance measurements. For example, one of the former techniques utilizes the time delay incurred due to the distance of the target object from the measurement setup. Typically, a sharp electromagnetic interrogating pulse signal is directed towards the target object, and a portion of the electromagnetic pulse signal reflected back from the target object is directed toward a detection unit. Due to the round-trip time delay $\Delta t$ of the electromagnetic pulse signal (toward the object and backwardly toward the detection unit), and the constant speed of the electromagnetic pulse signal c, the distance of the target object can be calculated using the following expression:

$$\Delta x = \frac{c \cdot \Delta t}{2} \tag{1}$$

This technique is usually termed time-of-flight (ToF). As the speed of electromagnetic radiation is eminently fast, for accurate, high-resolution distance measurement, the round-trip time delay $\Delta t$ of the electromagnetic pulse signal needs to be measured with high precision. Moreover, typically this requires high-speed detector and fast acquisition electronics (measurement bandwidth) for achieving the task. Due to the requirement for high-speed and sensitive detector unit tailored with fast acquisition electronics and high-power electromagnetic source, systems based on ToF techniques tend to be very expensive, or alternatively cheap but with poor performances, especially when using an electromagnetic source in the optical/IR regime. In addition, ToF based measurement systems are also very sensitive to backlight caused by different sources, for example, the sun.

A different technique, known as frequency-modulated continuous wave (FMCW), enables to filter the backlight noise through coherent detection and hence improves the imaging range and performance due to higher signal-to-noise-ratio (SNR). In this technique, the transmitted electromagnetic wave is in the form of a linearly increasing (and/or decreasing) frequency signal, known as "chirp". A part of the returned signal reflected from the target is superposed with a reference ("chirp") signal. Due to the time delay, caused by the distance of the target object, the frequency of the returned signal has a different frequency, shifted compared to the reference signal, and a beating pattern is detected. Additionally, the frequency of the reflected signal may change by the movement of the target object causing Doppler shift. The beating pattern can be analyzed to measure the distance of the object, together with its velocity. In the RF regime, for high lateral resolution, a large antenna (phased array) and/or small wavelength needs to be used. This leads to a high acquisition rate, leading to high costs. In the optical/IR regime, a light source with a long coherence length and decent bandwidth integrated with high-speed and sensitive detectors need to be used. As a result, this technique is considerably expensive to utilize. Additionally, the resolution is highly dependent on the bandwidth and the acquisition time.

Another technique, known as optical coherence tomography (OCT), is frequently used in bio-medical examinations and thin layers profiling. In this technique the electromagnetic source being used is usually in the optical/IR regime and exploits the short coherence length of the light source for "white light interferometry" in order to measure the cross-section of the examined sample.

In such OCT techniques, signals generated by, usually broadband, short coherence light source, is split into two arms using a beam splitter. One portion of the split signal is directed towards the examined sample, along an optical path termed the sample arm, and the second portion of the split signal is directed towards a reference mirror, along a path termed the reference arm. The signals reflected in both the sample and the reference arms are superposed on a detector. Due to the low coherence length of the light source, light reflected only from a specific depth inside the examined sample, defined by the reference arm position, will interfere with the reference signal. By repositioning the reference mirror of the reference arm, the reflectance amplitude at different depths is measured, and cross-sectional information of the examined sample is therefrom determined. The resolution in this method is limited by the coherence length of the light source, and the imaging range is limited by the scanning range of the reference arm mirror. Another related technique, utilizing different hardware and analysis schemes, used for this task, is known as Fourier domain optical coherence tomography (FDOCT), wherein the reference mirror is fixed in place and spectrometry is used, whereby similar results can be achieved.

International Patent Publication No. WO 2019/234752 describes a method of detecting objects in a region that comprises transmitting to the region a radiofrequency signal characterized by a coherence range and receiving an echo signal from the region. The method comprises processing the transmitted signal and the echo signal to provide a processed signal, determining at least an existence of objects within the coherence range based on the processed signal. The method dynamically varies the coherence range, and repeats the transmission, receiving, and processed to determine at least an existence of objects within other coherence ranges.

US Patent Publication No. 2018/299255 describes a method of inspecting a multilayer sample, comprising: receiving, at a beam splitter, light and splitting the light into first and second portions; combining, at the beam splitter, the first portion of the light after being reflected from a multilayer sample and the second portion of the light after being reflected from a reflector; receiving, at a computer-controlled system for analyzing Fabry-Perot fringes, the combined light and spectrally analyzing the combined light to determine a value of a total power impinging a slit of the system for analyzing Fabry-Perot fringes; determining an optical path difference (OPD); recording an interferogram that plots the value versus the OPD for the OPD; performing the previous acts of the method one or more additional times with a different OPD; and using the interferogram for each of the different OPDs to determine the thicknesses and order of the layers of the multilayer sample.

Chinese Patent Publication No. 108964778 describes a decoding device used for time bit-phase encoding. The decoding device comprises an unequal-arm Michelson interferometer, two photoelectric detectors, a decoding unit and a circulator, wherein the unequal-arm Michelson interferometer comprises a beam splitter and two reflectors, the two reflectors are connected with the beam splitter to form a long arm and a short arm of the interferometer respectively, a time difference value corresponding to an arm length difference of the unequal-arm Michelson interferometer is identical with a time interval between two time mode optical pulses of a phase basis vector; the two photoelectric detectors are connected with two output ports of the unequal-arm Michelson interferometer respectively; the decoding unit is connected with the two photoelectric detectors, and performs decoding under the phase basis vector and/or time basis vector according to outputs of the photoelectric detectors; and the circulator is connected with an input port of the decoding device, an output port of the unequal-arm Michelson interferometer and one of the photoelectric detectors.

GENERAL DESCRIPTION

The present application provides a distance measurement technique utilizing coherent detection and finite coherence electromagnetic signals.

Generally, for an electromagnetic source with a gaussian spectrum, the intensity of the interference signal obtained from interrogating ($I_1$) and reference ($I_2$) beams transmitted from the same source and experiencing a spatial delay, is measured by a detector ($I_{det}$) and can be expressed by:

$$I_{det} = \frac{1}{4}\left[ I_1 + I_2 + 2 \cdot \sqrt{I_1 I_2} \cdot \cos(\phi)e^{-\frac{\Delta x^2}{2l_c^2}} \right] \tag{2}$$

where $I_1$ and $I_2$ are the optical intensities of the interrogating and reference beams, $\phi$ is the relative phase between the interrogating and reference arms/paths at the detector, $l_c$ is the coherence length of the signal source, and $\Delta x$ is the OPD between paths of the interrogating and reference signals. In this connection, it should be noted that the present technique is described herein in connection with optical radiation for simplicity. It should be understood that the present technique may be used with optical and non-optical electromagnetic radiation with the appropriate modification as described herein below. It should further be understood that the term optical path is used herein for describe effective length of propagation of an electromagnetic signal being of optical or non-optical frequency. Such effective length may be affected by physical length of path of propagation as well as by effective speed of the radiation (e.g., refractive index and/or dielectric constant and permeability along the path)

The relation between the coherence length ($l_c$) of the electromagnetic signal source and the bandwidth ($\Delta k$) for a Gaussian spectrum can be expressed by:

$$l_c \cong c \cdot \tau_c = \frac{2c}{\pi \cdot \Delta v} = -\frac{2\lambda^2}{\pi \cdot \Delta \lambda} = \frac{4}{\Delta k} \tag{3}$$

where c is the speed of light, $\tau_c$ is the coherence time, $\Delta v$ is the linewidth of the source, $\lambda$ is the central wavelength of the source, and $\Delta \lambda$ is the width of the wavelengths range of the source.

As indicated, ToF techniques measure the distance directly from the time delay of a reflected signal; FMCW techniques use frequency analysis for this task; in OCT approach finding the zero OPD, or Fourier analysis, is used to extract the distance. The present technique, however, utilizes coherence factor (e.g., coherence length and/or coherence time) in interference of an electromagnetic signal between reference and interrogating paths, to determine the time delay between a reference beam and the reflected interrogating beam. This enables to determine the distance to an object from which the interrogating beam is reflected.

The present technique utilizes an optical arrangement comprising two or more reference arms providing corresponding two or more delay lines. This configuration enables extract depth information by measuring directly to coherence factor and fundamentally eliminating the ambiguity issues associated with variation of intensity such as the inverse square law $$\left( \frac{1}{R^2} \right),$$

effective numerical aperture, and/or target reflectivity.

The term coherence length used herein should be broadly interpreted as the coherence length of an electromagnetic signal source as described in Salamon, T. "*Michelson and Fabry-Perot interferometers with light sources of Gaussian and Lorentzian spectral distribution*", Acta Physica 36, 269-286 (1974). Specifically, coherence length relates to propagation distance over which a coherent wave maintains a specific degree of coherence.

Thus, according to a broad aspect, the present invention provides a system comprising at least one light source arrangement configured to provide illumination of a selected wavelength range and certain coherence length, an optical arrangement, and a detection arrangement comprising at least one detector unit;

said optical arrangement comprised optical elements forming at least first and second interferometer arrangements, each of said first and second interferometer arrangements is formed of a reference path and an interrogating path, said interrogating path comprises optical arrangement adapted to direct light portions toward a target object and collect light portions reflected from said target object; said reference path and interrogating path generate an interference signal on at least one detector of the detection arrangement, thereby generating detection data comprising at least first and second detected signals indicative of interference signal of said first and second interferometer arrangements;

wherein said first and second interferometer arrangements are configured with respective first and second different coherence factors being associated with at least one of optical path of reference paths of the first and second interferometer arrangements, and coherence length of light passing in said first and second interferometer arrangements;

and wherein a relation between said at least first and second detected signals is indicative of a distance to said target object.

According to some embodiments, interrogating paths of said least first and second interferometer arrangements may be at least partially overlapping.

According to some embodiments, the at least partially overlapping portion of said interrogating paths of said least first and second interferometer arrangements may comprise confocal optical elements for illuminating said target object and for collecting light reflected from said target object.

According to some embodiments, the at least partially overlapping portion of said interrogating paths further may comprise a circulator unit configured to receive the interrogating signal in a first port thereof and direct it towards the target object via a second port thereof and receive the at least one return signal via said second port and direct it towards the detection arrangement via a third port thereof.

According to some embodiments, the system may further comprise a control unit configured for receiving and processing said detection data and to determine distance of said target.

According to some embodiments, the processing may comprise determining a relation between coherence terms in said first and second detected signals.

According to some embodiments, the processing may further comprise utilizing data on intensity of constant terms associated with intensity of light portions of said reference paths and said interrogating paths.

According to some embodiments, the optical arrangement comprises optical fibers or waveguides.

According to some embodiments, the detection arrangement may comprise at least two detector arrays, said interrogating paths is configured for illuminating a field of view and for collecting light reflected from said field of view to form image data on detection plane of said detection unit, thereby enabling detection of distance map of said field of view.

According to some embodiments, the detection arrangement may be configured to provide balanced detection of said interference signal, said at least one detector unit comprises respective one or more additional detector units, thereby enhancing signal to noise ratio and filtering out at least one of background noise and distance independent components from the measurement data.

According to some embodiments, the light source arrangement may comprise at least one broadband light source.

According to some embodiments, the light source arrangement is adapted to emit light of at least first and second wavelength ranges to propagate in corresponding said at least first and second interferometer arrangements. The light source arrangement may be adapted for sequentially emit light of said first and second wavelength ranges, and wherein said first and second wavelength ranges are associated with corresponding first and second different linewidths, thereby affecting coherence length of light of said first and second wavelength ranges.

According to some embodiments, the at least first and second interferometer arrangement may be overlapping along interrogating path and at least a portion of reference paths.

According to some embodiments, the at least portion of overlapping reference path overlapping between said at least first and second interferometer arrangement, comprise one or more wavelength selective delay lines thereby differentiating optical path of light portions of at least first and second wavelength ranges.

The at least portion of overlapping reference path may comprise one or more fiber Bragg grating array (FBGA) elements configured to reflect selected one or more wavelength ranges, thereby varying optical path of said one or more wavelength selective delay lines.

According to some embodiments, the system may be formed within a photonic integrated circuit.

According to one other broad aspect, the present invention provides a system comprising: light source arrangement configured for emitting at least one light beam of certain coherence length, an optical arrangement comprising at least one reference arm, transmitting optics for directing at least one interrogating beam toward a target and collection optics for collecting reflected signal from said target, and a detection arrangement comprising at least two detectors configured for detecting interfered signals of said reflected signal and corresponding reference signal, said detection unit is configured for generating at least first and second detected signal being together indicative of a distance of said target; wherein the light source arrangement is configured to emit at least first and second light beams having first and second different coherence lengths, said interfered signals being formed of combined reference signal with corresponding one of reflected signal associated with said first and second light beams.

The system may further comprise a control unit configured for processing said first and second detected signals and determine distance of said target. The system may also further comprise any additional element or configurations as described above.

According to yet another broad aspect, the present invention provides a system comprising: light source arrangement configured for emitting at least one light beam of certain coherence length, an optical arrangement comprising at least one reference arm, transmitting optics for directing at least one interrogating beam toward a target and collection optics for collecting reflected signal from said target, and a detection arrangement comprising at least two detectors configured for detecting interfered signals of said reflected signal and corresponding reference signal, said detection unit is configured for generating at least first and second detected signal being together indicative of a distance of said target; wherein the optical arrangement comprises at least first and second reference arms having first and second different lengths and configured for directing light portions forming corresponding at least first and second reference beams, said interfered signals being formed of combined reflected signal with corresponding one of the first and second reference beams.

The system may further comprise a control unit configured for processing said first and second detected signals and determine distance of said target. The system may also further comprise any additional element or configurations as described above.

According to yet another broad aspect, the present invention provides a method for determining distance to a target, the method comprising:

generating at least one electromagnetic beam having certain coherence length;

directing a first reference portion of the beam along a first reference path having first length;

directing a second reference portion of the beam along a second reference path having a second length different than the first length; and directing a third portion of the beam toward the target;

collecting reflection of said third portion from the target;

combining a first portion of collected reflected radiation with said first reference portion to form a first combined signal and a second portion of the collected radiation with said second reference portion to form a second combined signal and detecting intensity of said first and second combined signals to generate corresponding first and second detected signals; and processing said first and second detected signals and determining data on distance of said target.

According to some embodiments, said processing of said first and second detected signal comprises determining a relation between coherence terms in said first and second detected signals.

According to some embodiments, said processing further comprises determining constant terms in said first and second detected signals.

Further additional aspects of the present invention provide a distance measurement apparatus comprising: one or more signal sources configured to generate one or more electromagnetic signals each having a defined different coherence length (linewidth); a splitting arrangement configured to split the one or more electromagnetic signals into at least one interrogating signal directed towards a target object and one or more reference signals, each propagating along a respective reference path, and combine each of the one or more reference signals with respective at least one return signal of the at least one interrogating signal reflected back from the target object; a detection arrangement comprising one or more detector units each configured to measure intensity of a respective combined signal from the splitting arrangement and generate measurement data indicative thereof; and at least one processing unit configured and operable to determine data on distance between the apparatus and the target object based on the measurement data and at least one of the following: difference between at least two coherence lengths (linewidths) of respective at least two electromagnetic signals from the one or more signal sources, and difference between lengths of the reference paths of respective at least two reference signals from the splitting arrangement.

In some embodiments the respective reference paths are of different length.

In some additional embodiments, at least one of the one or more signal sources is configured to generate first and second electromagnetic signals having defined different coherence lengths (linewidths). The at least one processing unit may be configured and operable to determine the target distance based on a ratio of coherence terms of the measurement data generated by the detection arrangement for the combined signals obtained for the first and the second electromagnetic signals.

In some embodiments the splitting arrangement is configured to form for each electromagnetic signal at least two reference signals, each associated with a different reference path length. The at least one processing unit can be configured to determine the distance based on a ratio of the coherence terms of the measurement data generated by the detection arrangement for the combined signals of each of the at least two reference signals with the at least one return signal from the target object.

Optionally, the different reference signals are obtained utilizing waveguide (e.g., fiber optic) paths of different lengths. The apparatus can comprise directing optical arrangements for directing the at least one interrogating beam towards the target object through free space medium, and/or for directing the at least one return signal towards the detection arrangement. At least one optical phase modulating unit can be used to control an optical phase of the at least one return signal. Optionally, an additional detection arrangement comprising respective one or more detector units configured to implement a balanced detection arrangement is used for cancelling out noise and the constant (the distance independent terms) components from the measurement data.

The apparatus comprises in some embodiments: one or more signal sources, each configured to produce electromagnetic signals having a different or variable coherence length. The splitting arrangement can be configured to split the electromagnetic signals from each of the one or more signal sources into interrogating signal portions directed towards the target object and respective reference signal portions propagating along a reference path, combine the return signals of the interrogating signal portions with the respective reference signal portions, and direct the combined signals towards a respective detector unit of the detection arrangement.

The at least one processing unit can be configured and operable to determine the distance based on ratios of the coherence terms of the data/signals measured by the detection arrangement.

The different reference signals are obtained in some embodiments utilizing a wavelength disperser. The wavelength disperser comprises in some embodiments a fiber Bragg grating array (FBGA) element. Optionally, at least one of the one or more signal sources is a broadband light source. Alternatively, at least one of the one or more signal sources is a swept signal source configured to successively produce two or more electromagnetic signals, each having a defined linewidth centered about a different central wavelength. The at least one processing unit can be configured and operable to determine the distance based on a ratio of the coherence terms of the measurement data generated by the detection arrangement for combined signals obtained for the two or more electromagnetic signals.

The apparatus comprises in some embodiments a circulator unit configured to receive the interrogating signal in a first port thereof and direct it towards the target object via a second port thereof and receive the at least one return signal via the second port and direct it towards the detection arrangement via a third port thereof. The splitting arrangement can comprise a switching unit configured to select for each electromagnetic signal from the one or more signal sources a respective propagation path having a defined length. A circulator unit can be used to receive one or more reference signals in a first port thereof and direct them to the switching unit via a second port thereof and receive respective back-reflected reference signals from the switching unit via the second port and direct them towards the detection arrangement via a third port thereof.

In some embodiments the apparatus comprises at least one detector unit that is implemented by a detector array consisting of a plurality detector elements, wherein each detector element is configured and operable to collect a portion of the return signal from a field of view associated with a different direction of arrival combined with a portion of the at least one reference beams. According to certain embodiments the apparatus comprises at least two detector arrays, wherein detector elements in one of the detector arrays have conjugate detector elements in the other detector arrays, collecting portions of the return signal from the same certain field of view. According to specific embodiments the apparatus comprises collection imaging optics configured to collect a plurality of return beams that are reflections of the interrogating beam.

In some possible embodiments the apparatus is implemented in a photonic integrated circuit.

The apparatus comprises in some embodiments one or more transmitting antenna elements configured to transmit the at least one interrogating signal towards the target object, one or more receiving antenna elements configured to receive the at least one return signal reflected back from the target object, a mixer arrangement configured to mix the at least one return signal from each one of the receiving antenna elements with two or more reference signals from the splitting arrangement, wherein the reference paths are implemented by waveguide elements. A filtering unit can be used to remove constant distance-independent components from the combined signals and generate respective filtered signals. The apparatus can comprise a divider arrangement configured to determine ratio signals indicative of a ratio of coherence terms of the filtered signals. A phase control arrangement can be used to control relative phase between the transmitting antenna elements.

In some possible embodiments the one or more signal sources are configured to generate the one or more electromagnetic signals with different coherence lengths. In such possible embodiments the mixer arrangement can be configured to mix the at least one return signal received from each one of the receiving antenna elements with one single reference signal from the splitting arrangement.

A coherence length measurement arrangement can be used to receive portions of the one or more electromagnetic signals generated by the one or more signal sources, identify changes in a coherence length of the one or more electromagnetic signals, and generate coherence length measurement data/signals indicative thereof for adjusting the coherence length of the one or more electromagnetic signals generated by the one or more signal sources. The coherence length measurement arrangement comprises in some embodiments a feedback loop for each of the one or more signal sources. Each one of the feedback loops can comprise a splitter configured to split a respective one of the one or more electromagnetic signal portions into long and short arms signal portions having different path lengths, a combiner configured to combine the long and short arms signal portions, and a detector configured to measure intensity of the combined signal from the combiner and generate the coherence length measurement data/signals based hereon. A phase modulator can be used for controlling phase of the short arm signal portion.

The apparatus comprises in possible embodiments a phase correction arrangement configured to generate measurement signals for monitoring relative phase of the two or more of the reference signals, or of split portions of the return signal. For this purpose, the apparatus can comprise a splitter configured to split the one or more reference signals into long and short reference arm signal portions, a phase modulator for controlling a phase of the short reference arm signal portion, a combiner configured to combine a portions of the long and short reference arm signal portions, and a detector configured to measure intensity of the combined signal from the combiner and generate measurement data/signals indicative thereof.

Another inventive aspect of the subject matter disclosed herein relates to a method of determining distance of a target object. The method comprising: splitting one or more source electromagnetic signals, each having a defined different coherence length (linewidth), into at least one interrogating signal directed towards a target object, and one or more reference signals each propagating along a respective reference path having a different length; combining each of the one or more time delayed reference signals with at least one return signal of the at least one interrogating signal reflected back from the target object; measuring intensity of the combined signals and generating measurement data indicative thereof; and processing the measurement data and determining the distance to the target object based on a difference between at least two coherence lengths (linewidths) of at least two of the source electromagnetic signals, or based on a difference between the path lengths of respective at least two reference signals.

The splitting can comprise splitting first and second electromagnetic signals having defined different coherence lengths (linewidths), and the determining of the distance of the target object can be based on a ratio of coherence terms of the measurement data generated for the combined signals obtained for the first and second source electromagnetic signals.

The method comprises in some possible embodiments collimating and/or focusing and/or a directing mechanism (e.g., Galvo or MEMS mirror) the at least one interrogating beam, and/or the at least one return signal. Optionally, but in some embodiments preferably, the method comprises a phase modulator to the interrogating beam or to return signals.

The method may comprise utilizing a balanced detection arrangement for measuring intensity portions of the combined signals and cancelling out noise and DC (distance independent) components from the measurement data.

The splitting comprises in some embodiments splitting two or more signal sources, each having a different coherence length, and each is split into an interrogating signal portion directed towards the target object and a respective reference signal portion propagating along a reference path, the combining comprises combining the return signals of the interrogating signal portions with the respective reference signal portions, the measuring comprises measuring intensity of each combined signal and generating measurement indicative thereof, and the processing comprises determining the distance based on a ratio of coherence terms of measurement data from the detection arrangement.

The splitting can be successively applied to two or more source electromagnetic signals. The method may comprise selecting for each successively split reference signal a respective propagation path having a defined different path length. The combining may comprise successively combining each reference signal passed through the selected different path length, and the processing may be applied to the successively combined signals obtained.

The method comprises in some embodiments transmitting by a transmit array antenna the at least one interrogating signal towards the target object and receiving by a receive array antenna the return signal reflected back from the target object. The method may comprise controlling relative phase between antenna elements of the transmit array antenna. The processing may comprise filtering constant distance-independent components from the combined signals. The method comprises in some embodiments determining ratio of coherence terms of the filtered signals.

In some embodiment the method comprises identifying changes in a coherence length of the one or more source electromagnetic signals, generating coherence length measurement data/signals indicative thereof, and adjusting the coherence length of the one or more source electromagnetic signals based on the coherence length measurement data/ signals. The identifying can comprise splitting each one of the one or more source electromagnetic signals into long and short arms signal portions having different path lengths, combining the long and short arms signal portions, and measuring intensity of the combined signals and generating the coherence length measurement data/signals based on the combined signals. The method may comprise controlling phase of the short arm signal portion.

The method comprises in some embodiments monitoring the relative phase of the one or more reflected interrogating beam and/or of the reference signals.

According to further additional broad aspect, the present invention provides a distance measurement apparatus comprising:

one or more signal sources configured to generate one or more electromagnetic radiation beams having certain coherence length;

an optical arrangement configured for directing one or more interrogating beams toward a target and for collecting at least a portion of said interrogating beam reflected from the target;

a splitting arrangement comprising at least one reference arm and configured to split said one or more electromagnetic radiation beams into said one or more interrogating beams, and one or more reference beams propagating along a respective reference path of said at least one reference arm, and combine said one or more reference beams with respective at least portion of said interrogating beam reflected from the target thereby forming one or more interfered combined signals;

a detection arrangement comprising one or more detector units configured for collecting said one or more interfered combined signals and generated data on intensity thereof; and at least one control unit configured to receive data on intensity of said one or more interfered combined signals and to utilize said data to determine a distance between said apparatus and said target object.

In some additional broad aspects, the present invention further provides a system comprising one or more signal sources comprise one or more transmitting antenna elements configured to transmit the at least one interrogating signal towards a target object, one or more receiving antenna elements configured to receive the at least one return signal reflected back from said target object, at least one mixer arrangement configured to mix the at least one return signal from said one of said receiving antenna elements with one or more reference signals thereby generating at least two mixed signals associated with two or more different coherence factors, wherein a relation between said at least two mixed signals is indicative of a distance to said target object.

According to some embodiments, said one or more transmitting antenna elements being configured to transmit at least two interrogating signals being different in at least coherence length between them.

According to some embodiments, said at least two interrogating signals being distinguishable in at least one of frequency range, polarization, and time of transmission.

According to some embodiments, said one or more reference signals comprise two or more reference signals having two or more respective different coherence factors.

According to some embodiments, the system may comprise at least one local oscillator for generating said one or more reference signals.

According to some embodiments, the system may comprise a phase control arrangement configured to control relative phase between the one or more transmitting antenna elements.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIG. 2 schematically illustrates a range detection apparatus according to some possible embodiments;

FIGS. 3A and 3B graphically illustrate coherence term amplitudes as a function of the object's distance for short and long reference arms/paths, respectively;

FIGS. 4A and 4B graphically illustrate the coherence term amplitudes for the short and the long reference arms/paths as a function of the object's distance, and an AC ratio parameter Γ, respectively;

DETAILED DESCRIPTION OF EMBODIMENTS

Figure 1:
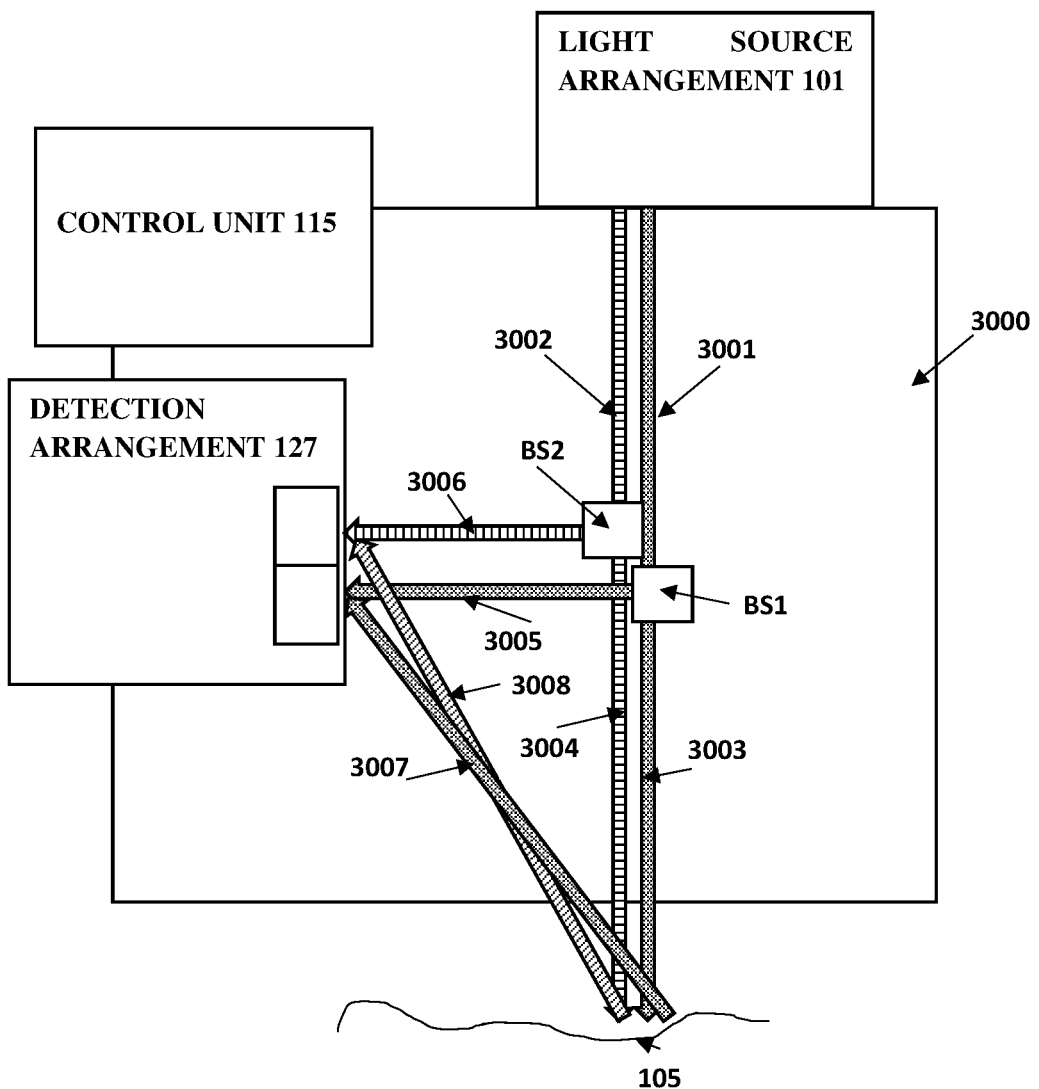
FIG. 1 schematically illustrated a system for range detection according to some embodiments of the invention.

One or more specific embodiments of the present disclosure are described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention such that persons skilled in the art will be able to make and use the embodiments, once they understand the principles of the subject matter disclosed herein. This invention may be provided in other specific forms and embodiments without departing from the essential characteristics described herein.

In a broad aspect, there are provided methods and apparatuses for distance measurement (also referred to herein as range detection) utilizing the coherence term of a transmitted electromagnetic beam combined with a smart delay line, or by varying the coherence length of the electromagnetic signal source.

For an overview of several example features, process stages, and principles of the invention, the range detection examples illustrated schematically and diagrammatically in the figures are generally intended for a long-distance, or short-distance, measurements. These range detection apparatuses are shown as one example implementation that demonstrates a number of features, processes, and principles used to provide distance measurement, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in coherence-based applications may be suitably employed and are intended to fall within the scope of this disclosure.

Reference is made to FIG. 1 exemplifying a system according to some embodiments of the invention. The system includes a light source arrangement 101, detection arrangement 127 and optical arrangement 3000. The system may also include a control unit 115. The optical arrangement includes one or more optical elements as described further below in more details. The optical arrangement 3000 defined at least first and second interferometer arrangements. In this exemplary illustration, beam splitter BS1 splits light beam 3001 to propagate along reference path 3005 an along interrogating path 3003 toward a target object 105. Portion of the beam 3007 reflected from the object 105 is directed to interfere with the reference beam 3005 to generate a detected interference signals, detected by detection arrangement 127. Similarly beam splitter BS2 splits light beam 3002 to reference beam 3006 and interrogating path 3004, followed by collection of reflected light portion 3008 generating a second detected signal. Coherence factor of the first and second interferometer arrangements is different by at least one of optical path, or length, of reference paths, or by coherence length of light beams 3001 and 3002 relative to the reference beams 3005 and 3006. According to the present technique, and as described below in more detail, a relation between the detected signals along the different interferometer arrangements provides data distance to said target object 105. The control unit 115 is generally configured to receive the detected signals and utilizes them to determine distance to the object 105. The following describes further arrangement and configurations of the present technique in more detail. As described hereinbelow, the technique may generally be used with electromagnetic radiation, being optical illumination, infrared, UV as well as Radio Frequency radiations or others electromagnetic sources.

Reference is made to FIG. 2, schematically illustrating a range detection system 100 according to some embodiments, wherein an electromagnetic interrogating beam 104 is used to determine a distance to a target object (also referred to herein as object) 105. The apparatus 100 includes a signal source 101, a splitting arrangement 125, a detection arrangement 127, and a processing unit 115 (also referred to herein as DAQ). In this non-limiting example, the splitting arrangement 125 includes first and second beam splitters, 102 and 103 respectively, and first and second reflectors 110 and 112 respectively. The detection arrangement 127 includes first and second detectors, 113 (A) and 114 (B) respectively. Optionally, but in some embodiments preferably, the signal source 101 may be a finite coherence length electromagnetic signal source configured to generate a source beam 119 of selected bandwidth (linewidth or wavelength range). The source beam 119 is directed at the splitting arrangement and is split into three portions using the first and second beam splitters, 102 and 103, respectively. The signal source 101 may generally be a CW or pulsed laser unit having selected bandwidth, distributed feedback (DFB) laser, External cavity laser (ECL), semiconductor lasers, microwave source and/or RF sources. In some configurations, the signal source 101 may include, or be associated with, a coherence length controller (e.g., phase modulator) for stabilizing the coherence length of the source beam 119. In some configurations, coherence factor (e.g., coherence length) of source beam 119 provided by the signal source 101 may be selectively varied, e.g., by bandwidth selection and/or by applying phase modulation to the source beam 119. Such variation of the coherence factor may be used for tunning of measurement sensitivity providing tunable dynamic range.

Particularly, the first beam splitter 102 is configured to split the source beam 119 into a first reference beam portion 109 directed to a first reflector (e.g., mirror) 110, and a first residual beam portion 122 directed towards the second beam splitter 103. The second beam splitter 103 is configured to split the first residual beam portion 122 into a second reference beam portion 111 directed towards a second reflector (e.g., mirror) 112, and a second residual beam portion acting as interrogating beam 104. The interrogating beam 104 is directed to illuminate a spot on the target object 105 (e.g., by a directing optics module—not specifically shown), and a portion 106 of the interrogating beam 104 is reflected back from the target object 105 to be collected by the apparatus 100, e.g., using the directing optics module.

The reflected interrogating beam portion 106 is directed back to the splitting arrangement (e.g., by a collection optics module, which is not specifically shown and in general may be the same or different from the directing optics module) wherein it is split into a first reflected interrogating beam portion 107, and a second interrogating reflected beam portion 108, thereby directed onto detectors, 113 (A) and 114 (B), respectively. Particularly, the reflected interrogating beam portion 106 is directed towards the second beam splitter 103, whereby it is split into the second reflected interrogating beam portion 108 directed towards the second detector 114, and a residual reflected interrogating beam portion 118. The residual reflected interrogating beam portion 118 is directed towards the first beam splitter 102, wherefrom it is directed as the first reflected interrogating beam portion 107 towards the first detector 113.

The first reference beam portion 109 of the source beam 119 is directed by the first beam splitter 102 towards a first reflector (e.g., mirror) 110, wherefrom it is reflected back (121) to the first beam splitter 102, which outputs therefrom the first reference beam 116 directed to the first detector 113 (A). The first reference beam 116 outputted from the first beam splitter 102 is combined at the first detector 113 (A) with the first reflected interrogating beam signal portion 107.

The second reference beam 111 portion, generated from the first residual beam portion 122, is directed by the second beam splitter 103 towards the second reflector (e.g., mirror) 112, wherefrom it is reflected (120) back to the second beam splitter 103, which outputs therefrom the second reference beam 117 directed to the second detector 114 (B). The second reference beam 117 outputted from the second beam splitter 103 is combined at the second detector 114 (B) with the second reflected interrogating beam portion 108.

The optical paths corresponding to the path of the first reference beam (109, 121, 116) and the second reference beam (122,111, 120, 117), are referred to herein as a first reference arm and a second reference arm, and collectively as reference arms. In this specific and non-limiting example, the optical paths of the beams propagating towards, and back from, the reflectors 110 and 112, are substantially perpendicular to the path of the beams propagating from the signal source 101 towards the target object 105. However, in possible embodiments, the path of the first and/or second reference arm is parallel (or angled with respect) to the path of the interrogating beam. The first reference beam 116 is delayed along the first reference arm by a first-time delay, and the second reference beam 117 is delayed along the second reference arm by a second time delay, whereas the difference in the delay between the first-time delay and the second time delay corresponds to the additional distance 2L between the first and second reference arms. Thus, the reference arm with the shorter time delay (i.e., that produces the first reference beam 116) is referred to herein as the short reference arm, and the reference arm with the longer time delay (i.e., that produces the second reference beam 117) is referred to herein as the long reference arm.

As explained hereinabove, the first reflected interrogating beam 107, and the second reflected interrogating beam 108, are superposed with the first and second reference beam portions 116 and 117, on the detectors 113 (A) and 114 (B) respectively. This way, one of the reflected interrogating beam portions is superposed with the reference beam propagating along the short reference arm at the first detector 113, and the second reflected interrogating beam portion is superposed with the reference beam propagating along the long reference arm at the second detector 114. Detector signals $I_{short}$ and $I_{long}$, generated by the first and second detectors 113 and 114, corresponding to these beams superposition, are directed into data acquisition module DAQ 115 (e.g., including one or more processors (CPU) and memories (MEM)), and thereby processed, as described hereinbelow, to form a detection result 126 for estimating the distance of the target object 105 from the apparatus 100.

In general, directing optics (not shown) can be used to direct the interrogating beam 104 towards the target object 105. The interrogating beam 104 may be a collimated or focused beam, and in such case may illuminate the target object 105, and a reflected interrogating beam 106 can be thus reflected from the object 105 towards the apparatus 100 and collected by collection optics (not shown), which may be same as (or different from) the directing optics.

To explain how the detection result can be calculated in some possible embodiments we define $x_0$ as the distance corresponding to the delay along the optical path length (OPL) of the short reference arm. The distance measured to the target object is defined as x, which may be measured with respect to $x_0$. The detector signal $I_{short}$ measured at the detector 113 corresponding with the short reference arm may be expressed as follows (assuming the signal source 101 is of a Gaussian spectrum):

$$I_{short} = \frac{1}{4}\left[ I_{R1} + \eta_{S1}I_s + 2 \cdot \sqrt{I_{R1}\eta_{S1}I_s} \cdot \cos(\varphi_1) \cdot e^{-\frac{\Delta k^2}{8} \cdot \Delta x^2} \right] \quad (4)$$

where $I_{R1}$ is the power intensity of the first reference beam 116 of the short reference arm; $I_s$ is the power intensity of the reflected interrogating beam 106 collected by the system 100; $\eta_{S1}$ defines an effective collection efficiency associated with intensity loss resulting from different reasons such as the collection optics, target's reflectivity, and speckles intensity variation of the reflected interrogating beam 106 from the target object 105. Thus, the power intensity of the first reflected interrogating beam 107 is $I_s \cdot \eta_{S1}$; $\varphi_1$ is the relative phase between the short arm reference beam 116 and the first reflected interrogating beam 107 as the beam are superimposed at the first detector 113 (A); $\Delta k$ is the bandwidth of the electromagnetic signal source 101; and $\Delta x = x - x_0$ is the distance between the apparatus 100 and the target object 105. Alternatively, in some embodiments, $I_s$ can be used to define the interrogating beam 104, and $\eta_{s1}$ is used to define the coupling efficiency of the interrogating beam 104 to the first detector (A) 113, including the reflectivity of the target object 105.

The third term on the right-hand-side (RHS) of equation (4), which depends on the distance to be measured $\Delta x$ i.e., $$2 \cdot \sqrt{I_{R1}\eta_{S1}I_s} \cdot \cos(\varphi_1) \cdot e^{-\frac{\Delta k^2}{8} \cdot \Delta x^2},$$

is sometimes referred to herein as the coherence term. The first and second terms on the right-hand-side (RHS) of equation (4), which are considered independent of the distance to be measured $\Delta x$ i.e., $I_{R1} + \eta_{s1}I_s$, are sometimes mutually referred to herein as the constant term or the distance independent term.

FIG. 3A illustrates absolute value of envelope amplitude of the coherence term 201 in equation (4) above, as a function of the distance Ax of the target object 105 from the apparatus 100. In this non-limiting example, the maximum amplitude is obtained when the target object 105 is positioned at $\Delta x = L_1 = 0$ where L1 relates to length of the short reference arm.

The signal $I_{long}$ measured at the second detector 114 (B), corresponding to the long reference arm, can be expressed as follows:

$$I_{long} = \frac{1}{4}\left[ I_{R2} + \eta_{S2}I_s + 2 \cdot \sqrt{I_{R2}\eta_{S2}I_s} \cdot \cos(\varphi_2) \cdot e^{-\frac{\Delta k^2}{8} \cdot (\Delta x - L)^2} \right] \qquad (5)$$

where $I_{R2}$ is the power intensity of the second reference beam 117 from the long reference arm, and $\eta_{S2}$ is the effective collection efficiency of the reflected interrogating beam 106 collected by the system 100 arriving at the second detector 114 (B). Thus, the power intensity of the second reflected interrogating beam 108 is $I_s^*\eta_{S2}$. $\varphi_2$ is the relative phase between the second reference beam 117 from the long reference arm and the reflected interrogating beam 108 arriving at detector 114 (B), and L is the half of the OPD between the long and short reference arms. Here, as well, the third term on the RHS of equation (5), is sometimes referred to as the coherence term, and the first and second terms on the RHS of equation (5) are sometimes mutually referred to herein as the constant term.

FIG. 3B illustrates the absolute value of envelope amplitude of the coherence term 202 in equation (5), as a function of the distance $\Delta x$ of the target object 105 from the apparatus 100. In this specific and non-limiting example, the maximum amplitude is obtained when the object is positioned at $\Delta x = L_2 = L$.

In certain embodiments, the following assumptions and estimations may be made in order to extract the distance $\Delta x$ of the target object 105 from the apparatus 100: (i) the intensities of the reference beams $I_{R1}$, and $I_{R2}$ from the reference arms are well-known and constant in time, or can be independently measured/determined; (ii) the ratio between the power intensities of the reflected interrogating signals 107 and 108 that arrive at the first and second detectors 113 (A) and 114 (B) can be found and used, their power intensity may be equal, but their relation is always constant in time, typically due to characteristics of the beams splitting arrangement 125; and (iii) the phases $\varphi_1$, and $\varphi_2$ can be adjusted actively or passively and the relative phase $\Delta\varphi = \varphi_1 - \varphi_2$ may be tracked if needed.

By filtering/subtracting the constant (distance independent) terms of Equations (4) and (5) (e.g., using hardware techniques such as balanced detector, electrical DC rejecting filter, or using software techniques) and dividing the two coherence (Coh) terms of Equations (4) and (5) a coherence ratio term $\Gamma$, is determined as follows:

$$\Gamma \triangleq \frac{Coh(I_{long})}{Coh(I_{short})} = \chi_{eff} \cdot \frac{e^{-\frac{\Delta k^2}{8} \cdot (\Delta x - L)^2}}{e^{-\frac{\Delta k^2}{8} \cdot (\Delta x)^2}} = \chi_{eff} \cdot e^{\frac{\Delta k^2 L}{4}\left[\Delta x - \frac{L}{2}\right]} \qquad (6)$$

where $\chi_{eff}$ is representing the constants parameters of the coherence terms, that are well-known a and can be expressed as follows:

$$\chi_{eff} \triangleq \sqrt{\frac{\eta_{s2}I_{R2}}{\eta_{s1}I_{R1}}} \quad \left\{ \text{assuming:} \frac{\cos(\varphi_2)}{\cos(\varphi_1)} \approx 1, \text{ or otherwise known} \right\} \qquad (7)$$

Accordingly, there is one to one relation between the coherence terms ratio $\Gamma$ to the distance $\Delta x$ of the target object 105 from the apparatus 100, which can be determined as follows:

$$\Delta x = \frac{4}{\Delta k^2 L}\ln\left[\frac{\Gamma}{\chi_{eff}}\right] + \frac{L}{2} \qquad (8)$$

FIG. 4A illustrates the absolute values of the amplitude of the envelope of the coherence terms 201 and 202 of the short and the long reference arms respectively (of equations (4) and (5)). Additionally, FIG. 4B illustrates the coherence ratio term $\Gamma$ 303 as a function of the distance $\Delta x$ of the target object 105 from the apparatus 100.

Any backlight noise can be considered in equations (4) and (5) as a constant distance and time independent component, such that its interference has a low influence on the measurement due to the filtering/subtraction of the constant components and the coherent detection scheme utilized.

Accordingly, the present technique utilizes illumination of a target by light of predetermined coherence length and determining data on first interference signal of light reflected from the target with first reference beam and of second interference signal of the reflected light with a second reference beam. The first and second reflected beams have corresponding first and second different optical paths. A ratio between interference terms of the first and second interference signal is indicative of optical path of the interrogating beams illuminating the target, thereby indicating a distance to the target.

Further, the system according to the present technique includes one or more light sources, configured to direct light of selected one or more coherence lengths toward a target. The system also includes one or more reference arms of selected different optical paths (lengths), and a detection unit including two or more detectors, each positioned for detecting intensity of interference signals between light reflected from the target and light of a corresponding one of the two or more reference arms. A relation between in intensities of the interference signals is indicative of a distance between the system and the target object.

Generally, according to some embodiments, the present technique utilizes one of the following configurations: at least one interrogating beam having selected coherence factor and two or more reference beams, or two or more interrogating beams and at least one reference beam. The detection unit is configured for detection of combined signals of reflected interrogating beam and a reference arm, to provide detection data indicative of a relation between coherence terms of the combined signals to determine coherence ratio term F. In some configuration, the technique may utilize prestored data on intensity of light source output and efficiency of beam splitters (e.g., the first and second beam splitters 102 and 103) for determining coherence ratio term FAs indicated, the present distance measurement technique may be implemented with more than two reference arms, as the reference and the returned signal can be split to any number of portions, as long as each reference portion is delayed in a different amount/length. For example, the reflected interrogating beam 106 may be split into a plurality of reflected beams (not shown), and by additional splitting of the source beam 119 a respective plurality of reference beams of different optical paths may be generated. The plurality of reflected interrogating beams may be combined respectively with the plurality of reference beams of different optical paths and directed onto a plurality of respective detectors to form a plurality of respective detected signals. The respective detected signals are detected providing information indicative of the distance Δx of the target object 105 from the apparatus 100. Thus, the target distance Δx may be determined based on ratios between respective pairs of coherence terms.

The simplified technique for determining target distance as shown in equation (8) above can be carried out assuming the signal source (101 in FIG. 2, or the other signal sources shown in the figures) has a gaussian spectrum. However, this distance calculation can be similarly carried out for other signal sources having any arbitrary spectrum, as long as the coherence ratio term Γ is a function of the distance Δx.

Figures 5, 6:
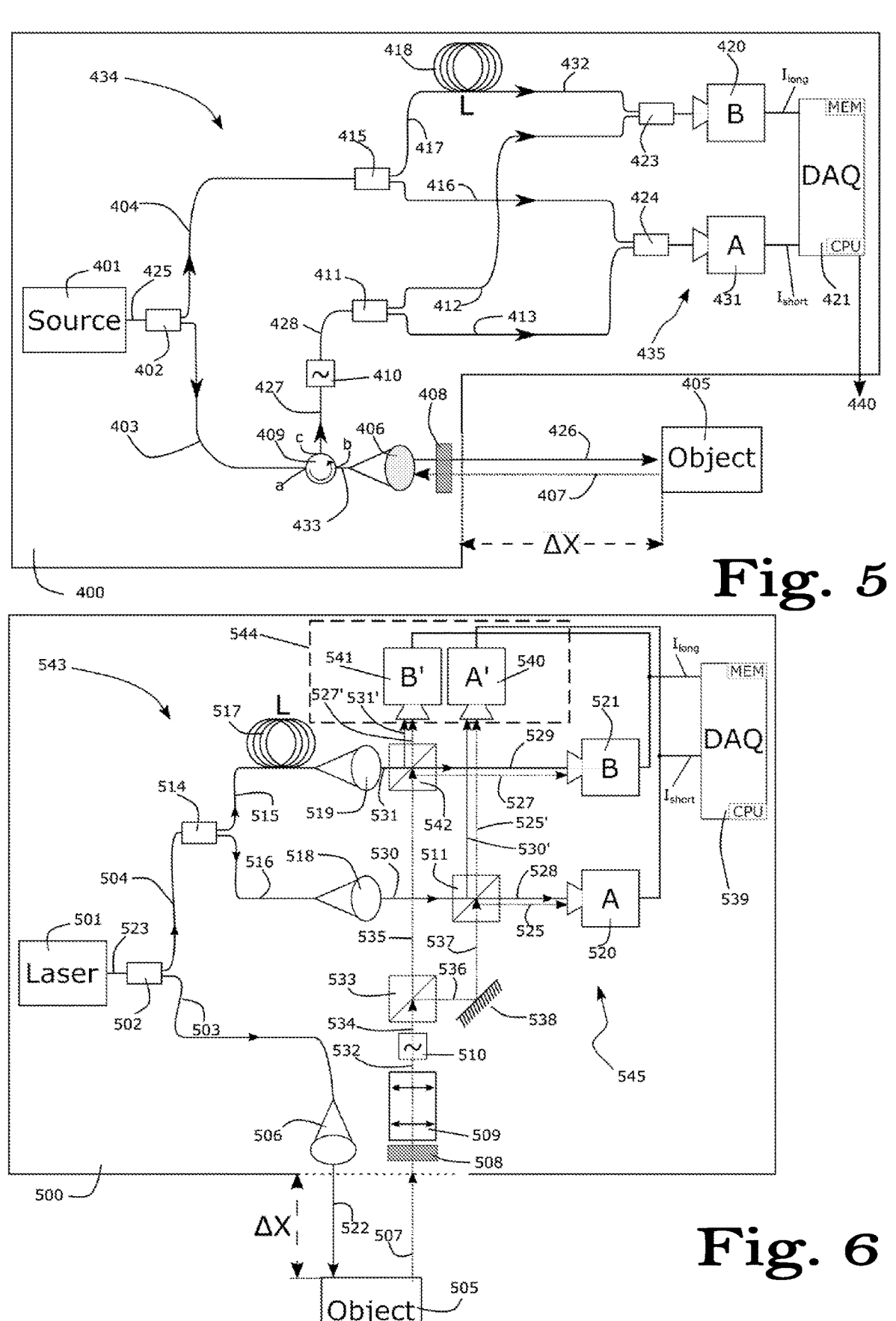
FIG. 5 schematically illustrates a fiber-based range detection apparatus, according to some possible embodiments.
FIG. 6 schematically illustrates a fiber-based range detection apparatus, and a free space detection unit thereof, according to some possible embodiments.

Another embodiment of a distance detection apparatus 400 according to the present disclosure is schematically illustrated in FIG. 5. The apparatus 400 includes a signal source 401, a splitting arrangement 434 including beam splitters 402, 415 and 411, beam combiners 423 and 424, and circulator 409, a detection arrangement 435 formed by at least first and second detectors, 420 and 431 respectively, and a processing unit 421 (also referred to herein as DAQ). In this distance detection apparatus 400 embodiment, electromagnetic beam(s) used to determine data on distance of the target object 405 are propagating in a waveguide e.g., an optical fiber.

In apparatus 400 the electromagnetic signal source 401 is configured to generate a beam having a finite coherence length for passage through a waveguide element 425. In some possible embodiments the waveguide elements shown in FIG. 5 can be implemented by one or more optical fibers. The electromagnetic beam passing through the waveguide element 425 is split into interrogating beam and two or more reference beams. Specifically, the initial beam is split by first beam splitter 402 into an interrogating beam portion passed through waveguide element 403, and a reference beam portion passed through the waveguide element 404. The reference beam portion passing through the waveguide element 404 is split by a second beam splitter 415 into a second reference beam portion passed through the wave-guide element 417, and a second reference beam portion passed through the waveguide element 416. Waveguide elements 416 and 417 are configured with different length, generally having length difference L. Thus, the second reference beam portion passed through the waveguide element 417 is delayed by an additional distance L obtained by the waveguide element 418 configured to introduce the additional time delay to the reference beam (432).

The interrogating beam portion passed through the waveguide element 403 is directed to the target object, typically using optical arrangement, e.g., lens 406 and filter 408. To enable transmission and collection of light using common optics, the apparatus may include circulator 409, e.g., a three-port circulator element, configured to permit passage of the interrogating beam portion introduced thereinto only through its second port b, that is coupled to output waveguide element 433. As seen, the interrogating beam portion 403 is introduced via port a into the circulator element 409, which permits passage thereof only through port b i.e., passage thereof from port a to port c is substantially prevented. The output waveguide element 433 is coupled to the second port b of the circulator element 409 provide output beam directed toward the target. The optical arrangement in this example includes a collimator 406, from which the interrogating beam 426 is directed towards the target object 405.

The electromagnetic interrogating beam 426 is thus directed towards the target object 405 substantially collimated, and it may be then passed through a narrowband filter 408 configured corresponding to the bandwidth of the electromagnetic signal source 401. Filter 408 is typically used to filter collected light enabling collection of light associated with reflection of the interrogating beam and thus reduce background noise. Accordingly, in this non-limiting example, the electromagnetic beam 426 illuminating the target object 405 is substantially collimated. In some possible embodiments directing optical arrangements may be used for directing the substantially collimated interrogating beam 426 towards the target object 405, and/or for collecting interrogating beam portions reflected from the target object 405. The directing optics, and/or additional collecting optics, may be used to collect a reflected interrogating beam portion 407, which may include reflection of the substantially collimated and band-filtered beam 426 from the target object 405.

Accordingly, a portion of the interrogating beam 426 illuminating the target object 405 is reflected back towards the collimator 406 to form a reflected interrogating beam portion 407, that is collected by the system 400 after being filtered by the narrowband filter 408 to remove ambient light components therefrom. In this example the reflected beam 407 is collected by common optics and diverted to collection arm using a circulator 409. More specifically, the return interrogating beam portion 407 is passed through the collimator 406 and the waveguide element 433, into the circulator 409 via its second port b. The circulator 409 is configured to permit passage of beam introduced thereinto via its second port b only through its third port c, which is thereby passed into the waveguide element 427 i.e., the passage from the third port c to the first port a is substantially prevented.

In some embodiments the reflected interrogating beam coupled into the waveguide element 427 from the second port b of the circulator 409 may be phase modulated by phase modulator 410 to form phase modulated reflected interrogating beam coupled to the waveguide element 428. The phase modulation of the reflected interrogating beam coupled to waveguide element 428 may be generated using, for example, but not limited to, Electro-Optic, Acousto-Optic, or piezoelectric based phase modulation provided in the phase modulator 410.

The phase modulated reflected interrogating beam passing through the waveguide 428 is split by the beam splitter 411 into a first reflected interrogating beam portion passed through the waveguide element 412, and a second reflected interrogating beam portion passed through the waveguide element 413, which are both coupled to the beam splitter 411. The first reflected interrogating beam passing through the waveguide element 412 is combined at the beam combiner 423 with the second reference beam portion passed through the waveguide element 432, and therefrom it is projected onto the second detector (B) 420, to thereby generate the measured signal $I_{long}$. The second reflected interrogating beam portion passing through the waveguide element 413 is combined at the beam combiner 424 with the first reference beam portion passing through the waveguide element 416, and therefrom it is projected onto the first detector (A) 431, to thereby generate the measured signal $I_{short}$.

The measured signals $I_{short}$ and $I_{long}$ from the detectors 431 and 420, are transmitted to be processed by the data acquisition module DAQ 421 (e.g., including one or more processors (CPU) and memories (mem) and/or formed by electronic circuit), as described hereinabove, to form a detection result 440 used for determining the distance of the target object 405 from the distance detection apparatus 400. By analyzing and comparing the interferences received in each detector, the distance of the target object 405 from the distance detection apparatus 400 can be determined, as described hereinabove, with the required adjustments.

As indicated above, this distance measurement technique can be implemented utilizing two or more reference arms (e.g., arms 416,417), used as paths for the reference beam from the waveguide element 404. For example, additional splitting of the reference beam from the waveguide element 404 can be used to form a plurality of reference arms associated with a plurality of reference beams of different time delays. The reflected interrogating signal from the waveguide element 427 can thus be split into a corresponding number of beam portions, and thereafter combined with the respective plurality of split reference beam portions, as long as each split reference beam portion is delayed in each reference arm by a different amount (time delay).

Additionally, the phase modulator 410 can be alternatively used to modulate the reference beam portion 404 and/or the source electromagnetic beam 425.

A respective plurality of superimposed/combined beams may be respectively produced and directed onto a respective plurality of detectors, to thereby form a plurality of respective measurement signals. The respective measurement signals can be analyzed and processed to provide information indicative of the distance of the target object 405 from the apparatus 400, and the distance may be determined based on ratios between respective pairs of coherence components of the measurement signals.

In some embodiments the apparatus may utilize an additional collection collimator lens, typically in addition to collimator 406. the additional collection lens may be used to collect the reflected interrogating signal portion 407, and to couple the reflected interrogating beam portion 407 directly into the waveguide element 427. This configuration provides parallel collection path. In other embodiments disclosed herein a circulator is used for sake of simplicity (e.g., FIG. 7), but a different collection mechanism can be similarly used to avoid the need of circulator elements, e.g., using a polarization beam splitter, etc.

Another possible distance detection apparatus 500 is schematically illustrated in FIG. 6, wherein an electromagnetic beam is used to measure the distance of a target object 505 from the apparatus 500. The apparatus 500 includes a signal source 501, a splitting arrangement 543 including beam splitters 502, 514 and 533, beam combiners 511 and 542, reflector 538, a detection arrangement 545 formed by at least first and second detectors, 520 (A) and 521 (B) respectively, and a processing unit 539 (also referred to herein as DAQ).

In this embodiment the reference and interrogating beams partially propagate in waveguide elements, such as optical fibers, while the reflected interrogating beam is collected and controlled in free space. As seen, output signal of the electromagnetic signal source 501 is coupled to a waveguide element 523 e.g., optical fiber, to form an electromagnetic source beam. Waveguide element 523 direct the source beam to beam splitter 502 splitting the beam into two beam portions, forming an interrogating beam portion passing through the waveguide element 503, and a reference beam portion passing through the waveguide element 504.

The interrogating beam portion passing through the waveguide element 503 may be substantially collimated by a collimator 506 and directed towards the target object 505. In some possible embodiments, directing optic arrangements (not shown) may be used for directing the substantially collimated interrogating beam portion 522 towards the target object 505. The directing optics, and/or additional collecting optics, is used to collect a reflected interrogating beam portion 507, formed by reflection of the interrogating beam 522 from the target object 505.

As seen, the electromagnetic interrogating beam portion 522 propagates in free space medium (e.g., air) onto the target object 505. The reflected interrogating beam portion 507 also propagates through the free space medium, but in the reverse direction, and as it is collected by the apparatus 500 it is filtered by a narrowband filter 508 configured corresponding to the bandwidth of the electromagnetic signal source 501 to remove ambient light components therefrom, to thereby form the reflected interrogating band-filtered beam 532. The reflected interrogating beam 507 is passed through the optical system 509 configured to control (focus and/or collimate) the reflected interrogating beam 507. The reflected interrogating beam portion 532 may be phase modulated using, for example, but not limited to, Electro-Optic, Acousto-Optic, or piezoelectric based modulation, of the phase modulator 510, to thereby form a reflected interrogating phase modulated beam 534 propagating through free space medium.

The reflected interrogating phase modulated beam 534 is split by the beam splitter 533 into two portions: (i) a first reflected interrogating phase modulated beam portion 536; and (ii) a second reflected interrogating phase modulated beam portion 535, both of which propagate through free space medium in different (e.g., orthogonal) directions. The first portion 536 of the reflected interrogating phase modulated and band-filtered beam is directed into the beam combiner 511, wherefrom it is reflected as the beam 525 through free space medium towards the first detector (A) 520.

In this particular and non-limiting example illustrated in FIG. 6, the first reflected interrogating phase modulated and band-filtered beam portion 536 is directed by the reflector (e.g., mirror) 538, thereby forming the reflected beam portion 537 directed by the reflector 538 through free space into the beam combiner element 511, to thereby form the beam 525 projected onto the first detector (A) 520. The second reflected interrogating phase modulated and band-filtered beam portion 535 also propagates through free space medium, and it is reflected by the beam combiner 542 through free space medium as the beam 527 projected onto the second detector (B) 521.

The reference beam portion passing through waveguide element 504 is used as a reference to the interrogating beam 507 reflected from the target object 505. The reference beam from the wave guide element 504 is split by the beam splitter 514 into a first reference beam portion passed through the waveguide element 516, and a second reference beam portion passed through the waveguide element 515. The first and second reference beams, passing through the waveguides 516 and 515 respectively, are set to propagate along two reference arms, each having a different time delay, a short delay reference arm and a long delay reference arm, respectively.

According to this non-limiting example the first reference beam portion passing through the waveguide element 516 is set to propagate through the short reference arm and to be substantially collimated by a collimator 518, to form the first collimated reference beam 530 passing through free space medium. The first collimated reference beam 530 passes through the beam splitter 511 and directed therefrom as the first collimate reference beam 528 projected onto the first detector (A) 520. The first reflected interrogating phase modulated beam portion 525, and the first collimated reference beam 528 are superposed on detector (A) 520, to thereby generate the detector signal $I_{short}$.

The second reference beam portion passing through the waveguide element 515 is delayed by the additional distance L using a waveguide element 517, and thereafter it is collimated by a collimator 519. The collimated second reference beam from the collimator 519 is passed through free space medium as the collimated second reference beam 531, and thereafter it is passed through the beam combiner 523. The collimated second reference beam propagates from the combiner 523 as the beam 529 is projected onto the second detector (B) 521. The second reflected interrogating phase modulated beam portion 527, and the collimated second reference beam 529 are superposed on the second detector (B) 521, to thereby generate the detector signal $I_{long}$.

The superposed signals, $I_{short}$ and $I_{long}$, can be measured electrically using the first and second detectors 520 and 521, respectively, and analyzed by DAQ 539. The DAQ 539 may include one or more processors (CPU) and memories (MEM) configured and operable for analyzing and comparing the interferences received in each detector and determine the distance of the target object 505 from the range detection apparatus 500, as described above with reference to FIGS. 2, 3 and 4.

In some possible embodiments known balanced detection techniques may be implemented using a balanced detectors arrangement e.g., as described in Stierlin, R. et al, *Excess-noise suppression in a fibre-optic balanced heterodyne detection system*, Opt Quant Electron 18, 445-454 (1986). According to such embodiments, an additional detection arrangement 544 including detectors, (A') 540 and (B') 541, is used, wherein detectors (A) 520 and (A') 540 form a first balanced detector, and detectors (B) 540 and (B') 541 form a second balanced detector. In this case the short arm reference beam 530 is split by the beam splitter/combiner 511 into first short arm signal portion 528 and second short arm signal portion 530', and the long arm reference beam 531 is split by the beam splitter/combiner 542 into first long arm signal portion 529 and second short arm signal portion 531'. The beam portions 525 and 528 are superposed on the detector (A) 520, the beam portions 527 and 529 are superposed on the detector (B) 521, the beam portions 525' and 530' are superposed on the detector (A') 540, and the beam portions 527' and 531' are superposed on the detector (B') 541. The signals detected by detectors 540 and 520 are of opposite phase and respectively, the signals detected by detectors 541 and 521 are also of opposite phase, thus, the cross-correlation term for each pair of detectors is of opposite sign. The outputs of the detectors (A') 540 and (B') 541 are electrically connected to the electrical signal outputs of the detectors (A) 520 and (B) 521, respectively, in a balanced configuration to form a differential detection signal (e.g., detected signal in detector 541 minus detected signal in detector 521). Thus, the detection of the $I_{short}$ signal includes detection of the cross-correlation term (with a factor of two) while the noise and the constant (distance independent) terms are filtered. In the same manner for the $I_{long}$ signal associated with detectors (B') 541 and (B') 521, the detected signal includes detection of the cross-correlation term (with a factor of two) while the noise and the constant (distance independent) terms are filtered out. This way the constant (distance independent) terms of Equations (4) and (5) and the backlight/ambient noise components can be efficiently filtered/cancelled out from the superposed signals, $I_{short}$ and $I_{long}$ received by the DAQ 539. It should be noted that such additional detection arrangement 544 can be similarly used in all of the other embodiments disclosed hereinabove and below.

In possible embodiments the range detection apparatus 500 is implemented with more than two reference arms e.g., in addition to the reference arms formed using the waveguide elements 516 and 515, to provide a plurality of reference signals (not shown) split from the reference beam passed through the waveguide element 504. The reflected interrogating beam 507 is thus split into a respective plurality of reflected interrogating beam portions (not shown). Each of the plurality of reference beam portions can be delayed along a respective reference arm by a different time delay. Accordingly, the plurality of split interrogating beams reflected from the target object 505 may be combined respectively with the plurality of reference beam portions of different time delays and directed onto a plurality of respective detectors to form a plurality of respective detected signals. The respective detected signals can be analyzed and processed to provide information indicative of the distance of the target object 505 from the apparatus 500, and the distance may be determined based on ratios between respective pairs of coherence components of the detected signals.

In some possible embodiments additional phase modulators (not shown) can be alternatively, or additionally, used to modulate the reference beam portion from the waveguide element 504 and/or the electromagnetic source beam from the waveguide element 523.

Figure 7:
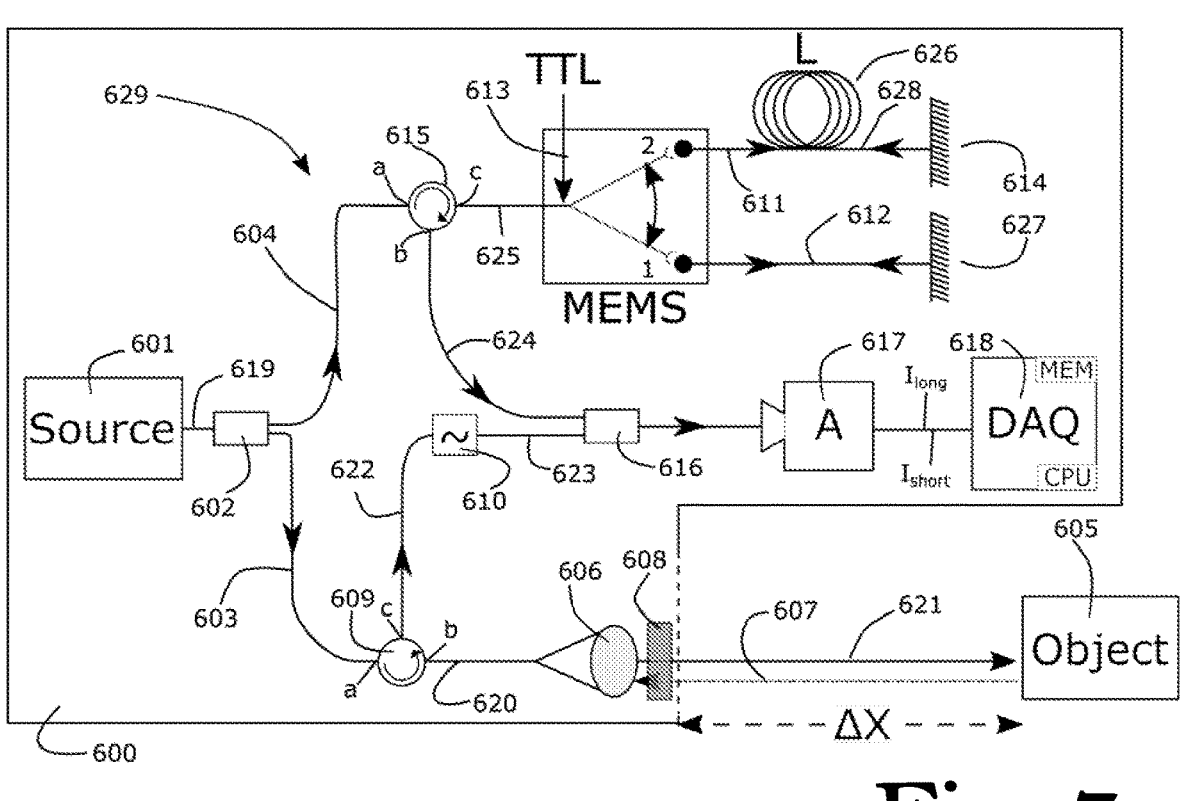
FIG. 7 schematically illustrates a range detection apparatus utilizing a microelectromechanical system (MEMS) switch for implementing a variable delay line with a single detector, according to some possible embodiments.

Turning to FIG. 7, a further exemplary embodiment of a distance measurement apparatus 600 is schematically illustrated. FIG. 7 schematically illustrates a configuration in which a single detector 617 is used, with a plurality of reference arms having different lengths, and a reference arm selection\switch mechanism 613. The apparatus 600 includes a signal source 601, a splitting arrangement 629 formed by at least beam splitter 602, beam combiner 616, and circulators 609 and 615, a detection arrangement including detector 617, and a processing unit 618 (also referred to herein as DAQ). In this specific and non-limiting example two (long and short) reference arms are used, and the shifting between these different delay reference arms is implemented using a Micro-Electro-Mechanical-System (MEMS e.g., optical MEMS) based switch.

The distance detection apparatus 600 utilizes an electromagnetic signal source 601, configured to generate beams having a finite coherence length, coupled to a waveguide element 619 for passage of the source beam therethrough. The waveguide elements used in this non-limiting example may be implemented by optical fibers. The electromagnetic beam produced by the signal source 601 passed through the waveguide element 619, is split by the beam splitter 602 into two portions: an interrogating beam portion passed through the waveguide element 603, and a reference beam portion passed through the waveguide element 604. The interrogating beam portion from the waveguide element 603 is passed through a three-port circulator element 609 to the collimator 606. The three-port circulator element 609 is configured to receive the reference beam from the waveguide element 603 via its first port a, and enable passage thereof via its second port b to the waveguide element 620, while substantially preventing its passage through the third port c.

The interrogating beam passed through the waveguide element 620 is then collimated by the collimator 606. The collimated interrogating electromagnetic beam from the collimator 606 is passed through a narrowband filter 608 to form a substantially collimated interrogating beam 621. The collimated interrogating beam 621 propagates through free space medium towards the target object 605 to measure its distance from the apparatus 600.

A portion of the collimated interrogating beam 621 illuminating the object 605, is reflected towards the apparatus 600 to form reflected beam 607. In some embodiments the reflected interrogating beam 607 is collected by collection optics (not shown). The reflected interrogating beam 607 collected by the system 600 can be filtered using the narrowband filter 608 configured to remove ambient light components therefrom, and it is then introduced into the waveguide element 620 by the collimator 606. The reflected interrogating beam passed through the waveguide element 620 is directed into the second port b of the three-port circulator 609. The three-port circulator 609 is configured to permit the passage of the reflected interrogating beam introduced thereinto via the second port b through its third port c, while substantially preventing its passage through its first port a, to thereby pass the reflected interrogating beam into the waveguide element 622. The reflected interrogating beam passed through the waveguide element 622 may be phase modulated using, for example but not limited to, Electro-Optic, Acousto-Optic, or piezoelectric based modulation, applied by phase modulator 610 positioned along the waveguide 622. The reflected interrogating beam is passed through the waveguide element 623 to the beam combiner 616, which output is projected onto the detector (A) 617.

The reference beam portion is directed by the waveguide element 604 into the first port a of the three-port circulator element 615. The three-port circulator 615 is configured to permit passage of the reference beam introduced thereinto via its first port a through its second port b, while substantially preventing its passage via its third port c, to thereby pass the reference beam into the waveguide element 625, from which it is directed to the switch mechanism 613. In this specific and non-limiting example, the switch mechanism 613 has two states, 1 and 2, configured to selectively couple the waveguide element 625 with a short reference arm (612), or with a long reference arm (611), respectively.

When the switch mechanism 613 is in state 1, the reference beam is guided into the short reference arm, wherein the reference beam portion is passed through the waveguide element 612, wherefrom it is backreflected by a reflector (e.g., mirror or retroreflector) 627. The reference beam thereby propagates from the reflector 627 backwardly through the waveguide element 612 and the switch mechanism 613, and therefrom it is redirected backwardly though the waveguide element 625 as a short-delay reference beam portion into the third port c of the circulator 615. The circulator 615 is configured to receive the short-delay reference beam portion introduced thereinto via its third port c and permit passage thereof via its second port b, while substantially preventing its passage via its first port a. The short-delay reference beam portion is directed by the circulator 615 along the waveguide element 624 to the beam combiner 616. The short-delay reference beam portion passed through the waveguide element 624 is combined in the beam combiner 616, which projects its output onto the detector (A) 617 to generate the short-delay detection signal $I_{short}$.

When the state of the switch mechanism 613 is changed into state 2, the reference beam portion passing through the waveguide element 625 from the circulator 615 is introduced into the long reference arm 611, wherein the reference beam portion is delayed by the additional distance L formed by the waveguide element 626 of the long reference arm. The reference beam portion is backreflected by a reflector (e.g., mirror or retroreflector) 614. The back-reflected reference beam portion propagates backwardly through the waveguide element 628 to the delay line 626 and the switch mechanism 613, wherefrom it is directed as long-delay reference beam portion into the waveguide element 625. The long-delay reference beam portion is directed by the waveguide element 625 into the third port c of the circulator 615, which permits passage thereof via its second port b into the waveguide element 624, while substantially preventing its passage through the first port a. The long-delay reference beam is directed by the waveguide element 624 to the beam combiner 616, which projects its output beam onto the detector (A) 617 for generating the long-delay detection signal $I_{long}$.

The state of the switch mechanism may be controlled by a control signal, e.g., the transistor-transistor logic (TTL) signal, and/or by control signals generated by the DAQ 618.

The short-delay, or long-delay, reference beam portion supplied by the waveguide element 624 is combined on the beam combiner 616 with the returned interrogating beam portion passed by the waveguide element 623 to the combiner 616. In states (1 and 2) of the switch mechanism 613 the back-reflected reference beam portion passed through the waveguide element 624, and the returned interrogating beam portion passed through the waveguide element 623, are superposed by the beam combiner 616. The superposed beam portions are directed by the combiner 616 onto the detector (A) 617 to generate the detection signal ($I_{short}$ or $I_{long}$) supplied to the DAQ 618 for processing and analysis. The DAQ 618 may include one or more processors (CPU) and memories (MEM) configured and operable to analyze and compare the interferences in the received $I_{short}$ and $I_{long}$ detection signals corresponding to the short (612) and long (611) reference arms, respectively, and determine therefrom the distance of the target object 605 from the apparatus 600, as described hereinabove with reference to FIGS. 2, 3 and 4. More specifically, the detector 617 generates temporal detection data having periods associated with $I_{short}$ and periods associated with $I_{long}$ in accordance with temporal switching of switch mechanism 613. The DAQ 618 utilizes time switching pattern of the switch mechanism 613 for processing of detector data to determine $I_{short}$ and $I_{long}$ measures and to determine distance to the target as described above.

As indicated above, in this embodiment as well as in other embodiments the apparatus 600 can be implemented with more than two reference arms, 612 and 611, utilizing a modified switch mechanism 613 having more than two states. In such embodiments the reference signal portion passed through the waveguide element 604, can be split into any number of beam reference portions, as long as each split reference signal portion is delayed by a different amount\time delay. Using suitable control signals (TTL), the modified switch mechanism can be used to interchange between a plurality of reference arms, each having the different delay time, and to collect the back-reflected beams from each of the plurality of the reference arms. This way, back-reflected reference beams can be sequentially introduced via the waveguide element 625, the circulator 615 and the waveguide element 624, to the combiner 616, for combining them therein with the return interrogating beam 607 from the target object 605. The detector 617 correspondingly generates a respective sequence of detection signals indicative of the superposition of each of the back-reflected reference beams from the different reference arms (according to the state of the switch mechanism) with the reflected interrogating beam. The DAQ 618 can be used to process the sequence of signals measured by the detector 617 and determine therefrom the distance of the target object 605 from the apparatus 600 based on ratios between pairs of separated signal components of the measured signals, as described hereinabove with reference to FIGS. 2, 3 and 4.

Additionally or alternatively, one or more phase modulators may be used to modulate the reference beam portion passed through the waveguide element 604, and/or through the waveguide element 625. This may be implemented over both waveguide and free-space medium, or combinations thereof, such as illustrated in FIGS. 2, 5, and 6 and described hereinabove.

Figure 8:
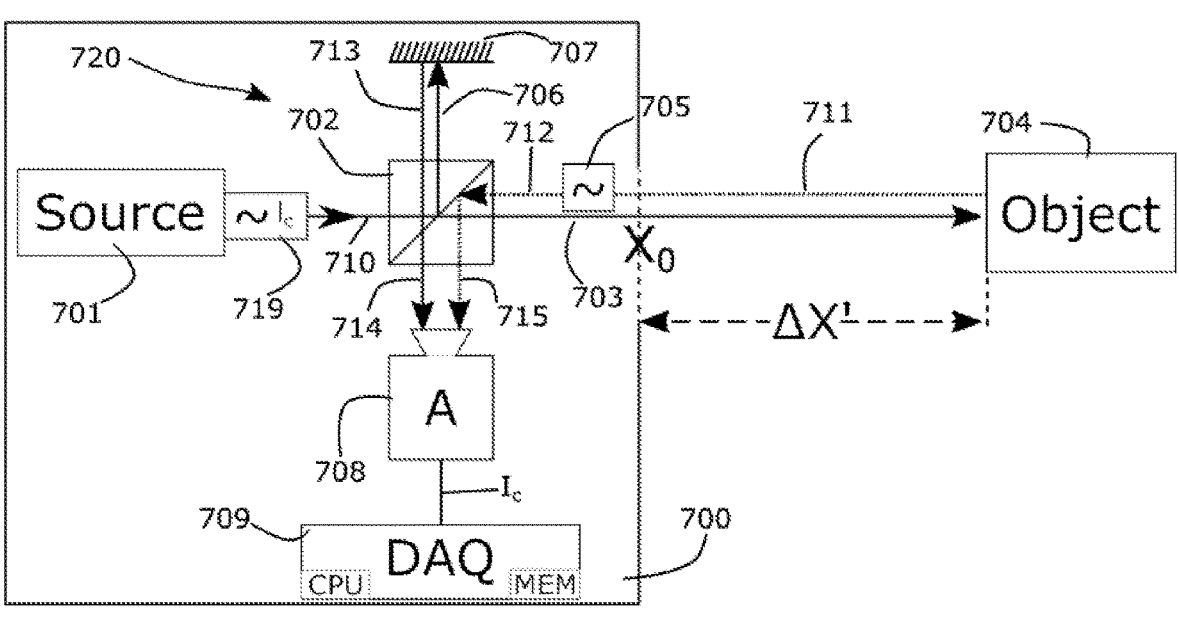
FIG. 8 schematically illustrates a range detection apparatus using variable coherence length source, according to some possible embodiments.

FIG. 8 schematically illustrates a distance measurement apparatus 700 utilizing variation of coherence length of the interrogating beam for determining distance of a target. As shown in FIG. 8, apparatus 700 includes an electromagnetic signal source 701 having a variable coherence length integrated with an interferometric system, used to measure a distance between the target object 704 and the apparatus 700. The apparatus 700 includes the signal source 701, a splitting arrangement 720 formed by at least beam splitter 702 and reflector 707, a detection arrangement including detector 708, and a processing unit 709 (also referred to herein as DAQ). In this specific and non-limiting example, a finite (and variable) coherence length signal source 701 (or 701+719) is used to generate a source electromagnetic beam 710 propagating therefrom through free space medium, which may have a variable coherence length that may be stabilized at a plurality of selected coherence lengths. The variable coherence length setting unit 719 may be integrated in the electromagnetic signal source 701, or alternatively, it may be an external component configured to provide the required coherence length control over the beams produced by the electromagnetic signal source 701.

The apparatus 700 includes a beam splitter 702 configured to split the source beam 710 into an interrogating beam portion 703, and a reference beam portion 706. The interrogating beam portion 703 is directed (e.g., using beam directing collimating/focusing optics) through free space medium towards the target object 704, and the reflected interrogating beam portion 711, reflected from the target object 704, is collected by the system 700 (e.g., utilizing collection optics that may be similar to, or different from, the directing optics). The reflected interrogating beam 711 received in the apparatus 700 may be phase modulated using, for example but not limited to, Electro-Optic, Acousto-Optic, or piezoelectric based modulation, of the phase modulator 705. The modulated reflected interrogating beam 712 is directed by the beam splitter 702 as interrogating beam 715 onto the detector (A) 708.

The reference beam portion 706, split by the beam splitter 702, is used as a reference beam as it is back-reflected by the reflector (e.g., mirror) 707 to form the back-reflected reference beam 713. The back-reflected reference beam 713 is directed through the beam splitter 702 to form the reference beam 714 directed onto the detector (A) 708. The reference beam 714 from the splitter 702 is superposed in the detector 708 with the reflected interrogating beam 715, to generate the detector signal $I_c$ received in the DAQ 709 for analysis and processing.

In some possible embodiments the variable electromagnetic signal source 701/719 may be stabilized/set consecutively about two different coherence lengths $c_1$ and $c_2$, to thereby generating corresponding detector signals, $I_{c1}$ and $I_{c2}$ at the detector (A) 708 at selected time pattern. The detector signals are transmitted to the DAQ 709. In some embodiments the DAQ 709 may include one or more processors (CPU) and memories (MEM) configured and operable to process and analyze the detector signals, $I_{c1}$ and $I_{c2}$, and determine therefrom the distance $\Delta x'$ between the target object 704 and the apparatus 700.

With a stabilized coherence length $lc_1$, a signal $I_{c1}$ measured at the detector A 708 can be expressed as follows:

$$I_{c1} = \frac{1}{4}\left[I_R + \eta_s I_s + 2 \cdot \sqrt{I_R \eta_s I_s} \cdot \cos(\varphi_1) \cdot e^{-\frac{\Delta k_1^2}{8} \cdot \Delta x'^2}\right] \tag{9}$$

where $I_R$, $I_s$ are the power intensities of the reference beam portion 714 and of the interrogating beam portion 711, respectively, $\eta_s$ is the effective collection efficiency of the reflected interrogating beam 711, thus the power intensity of the reflected interrogating beam 715 received from the object 704, and collected at the detector A 708, is $I_s \cdot \eta_S$, $\varphi$ is the relative phase between the reference arm 714 and the reflected interrogating signal arm 715 arriving at detector (A) 708, $\Delta k_1$ is the linewidth of the signal source 701 with coherence length $lc_1$, and $\Delta x'=x-x_0$. Alternatively, in some possible embodiments $I_s$ may be used to define the interrogating beam portion 703, and in this case, $\eta_s$ is used to define the reflectivity of the target object 704, the backpropagation in the free space medium, the coupling efficiency of the apparatus 700, and the coupling ratio to the detector 708 (as also mentioned hereinabove with respect to Equation (4)).

The coherence length of the signal source 701 may be changed by the coherence length setting unit 719 to a second coherence length $lc_2$, for measurement of the respective detector signal $I_{c2}$, while the target is substantially at the same position. In this operational condition the signal measured at the detector 708 corresponding to the second coherence length may be expressed as follows:

$$I_{c2} = \frac{1}{4}\left[I_R + \eta_s I_s + 2 \cdot \sqrt{I_R \eta_s I_s} \cdot \cos(\varphi_2) \cdot e^{-\frac{\Delta k_2^2}{8} \cdot \Delta x'^2}\right] \tag{10}$$

where $\Delta k_2$ is the linewidth of the signal source 701/719 with coherence length of $lc_2$.

According to this specific and non-limiting example, the following assumptions and estimations may be made in order to determine the distance $\Delta x'$ of the target object 704 from the apparatus 700: (i) the intensity of the reference arm $I_{R1}$ is well-known and relatively constant in time, or can be measured/determined, and (ii) the phases $\varphi_1$, $\varphi_2$ can be adjusted actively, or passively, assuming the phase does not change between the measurements $lc_1$ and $lc_2$ and that the phase is constant in time.

By eliminating/filtering from the signals the part that is associated with the first two terms of the RHS of equations (9) and (10), and computing the ratio between the coherence terms of the two respective measurements (e.g., by the DAQ 709 or using an analog divider unit), the value $\Gamma$ indicative of the ratio between the respective coherence terms may be determined as follows:

$$\Gamma' \triangleq \frac{Corr(Ic_1)}{Corr(Ic_2)} = \frac{e^{-\frac{\Delta k_1^2}{8}(\Delta x')^2}}{e^{-\frac{\Delta k_2^2}{8}(\Delta x')^2}} = e^{\frac{\Delta x'^2}{8}(\Delta k_2^2 - \Delta k_1^2)} \tag{11}$$

Here again, there is one to one relation between the calculated value $\Gamma$ and the distance $\Delta x$ between the target object 704 and the apparatus 700, which can be expressed as follows:

$$\Delta x' = \sqrt{\frac{8 \cdot \ln(\Gamma')}{(\Delta k_2^2 - \Delta k_1^2)}} \tag{12}$$

It is noted that although this specific and non-limiting example utilizes a variable coherence length source propagating in a free-space medium, in other possible embodiment, however, with the required changes, the apparatus 700 can be similarly implemented utilizing waveguides (e.g., optical fibers) for propagating the beams in accordance with the above examples.

Additionally, in some possible embodiments one or more phase modulators can be also placed in the reference arm 706, and/or the in the path of the source electromagnetic beam 710.

This technique method can be similarly implemented utilizing a plurality different electromagnetic beam sources configured (e.g., Source 1, Source 2 . . . , Source n where n>2 is an integer) for creating a full 3D image of one or more target objects (not shown), for example, but not limited to, utilizing a vertical cavity surface emitting laser (VCSEL) array, a full field reference mirror 707 and a respective array of detection units. This way, multiple points can be imaged utilizing a proper imaging system (using the full field mirror) and a respective array of detection units for each beam of the apparatus.

Figure 9:
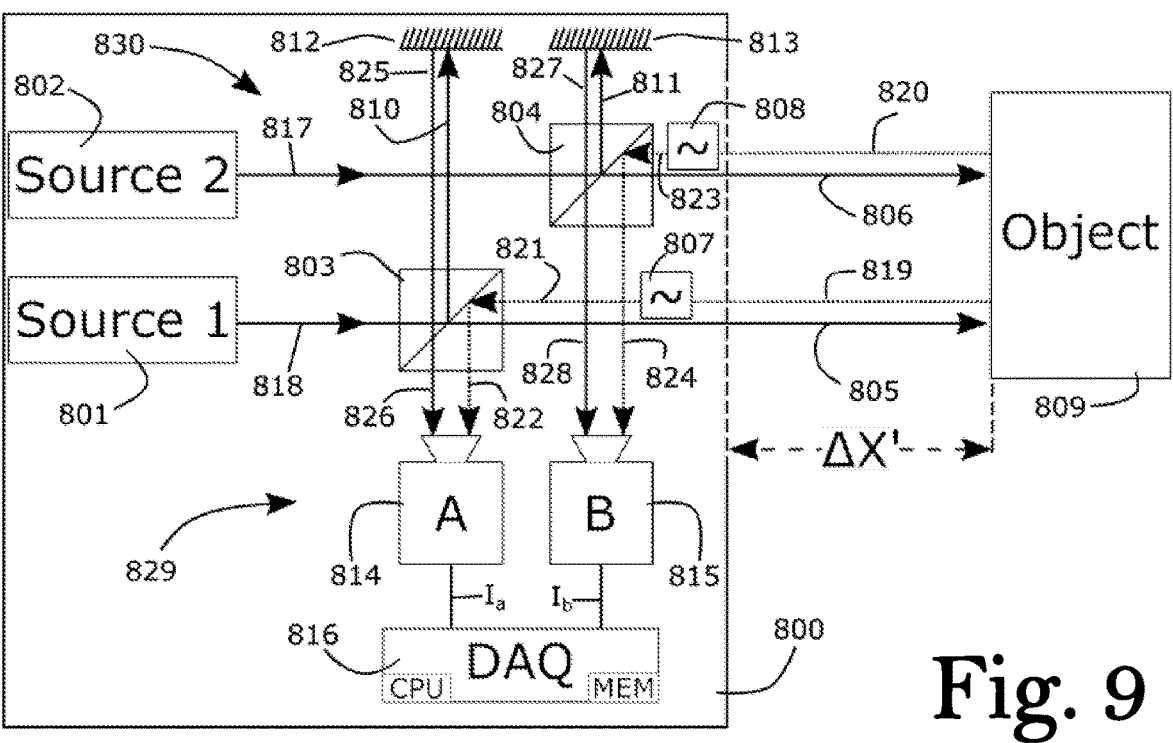
FIG. 9 schematically illustrates a range detection apparatus using two different coherence length sources, according to some possible embodiments.

Reference is now made to FIG. 9 schematically illustrating another possible embodiment of a distance measurement apparatus 800, using multiple signal sources. In this example the apparatus 800 includes two signal sources 801, 802, however two or more signal sources may be used. The signal sources 801 and 802 have different coherence lengths. The apparatus 800 further include a splitting arrangement 830, generally formed by beam splitters 803 and 804, configured to split the source beams to respective interrogating portions 805 and 806 and reference portions 810 and 811. The reference beams 810 and 811 are directed to propagate in corresponding reference arms respectively defined by reflectors 812 and 813. A detection arrangement 829 including detectors 814 and 815 is used for detecting intensity of interfered (superpose) signals as described above and provide detection data to a processing unit 816 (also referred to herein as DAQ).

In this exemplary configuration, apparatus 800 utilizes two or more interrogating beams having corresponded two or more coherence lengths, and corresponding reference beams, typically of similar length. In some configurations, the reference beams may be configured to propagate within a common reference arm and utilize a wavelength selective filter for splitting the collected reflected beams and reference beams to the respective detectors 814 and 815.

In this specific and non-limiting example two electromagnetic signal sources, 801 and 802, with two different coherence lengths, $lc_1$ and $lc_2$, respectively, are generating two respective electromagnetic beam, 818 and 817 propagating through free space medium, each of which is split into two portions by the beam splitters, 803 and 804, respectively, to form respective two interrogating beam portions, 805 and 806, and two respective reference beam portions, 810 and 811. The first interrogating beam portion 805, and the second interrogating beam portion 806, are directed through the free space medium (e.g., using separate, or common, directing optics—not shown) towards the target object 809. Respective portions of the first and second interrogating beams, 819 and 820, are received by the apparatus 800 e.g., utilizing separate collection optics (not shown), and/or by a common optical arrangement, in which case the signal sources may be optionally operated separately in time. The reflected interrogating beams, 819 and 820, may optionally be phase modulated using, for example but not limited to, Electro-Optic, Acousto-Optic, or piezoelectric based modulation, of the phase modulators, 807 and 808, respectively. The collected and optionally phase modulated reflected interrogating beams, 821 and 823, are reflected by the beam splitters, 803 and 804, respectively, and the reflected beams portions, 822 and 824, are projected onto the detectors, 814 and 815, respectively.

The reference beam portions, 810 and 811, propagate towards reflectors (e.g., mirrors) 812 and 813, respectively, thereby forming respective reflected reference beam portions, 825 and 827. The reflected reference beam portions, 825 and 827, pass through the beam splitters, 803 and 804, to form the back-reflected reference beam portions, 826 and 828, that are projected onto the detectors, 814 and 815, respectively.

The reflected interrogating beam portions, 822 and 824, are superposed with the back-reflected reference beam portions, 826 and 828, at the beam splitters, 803 and 804, and detected by the detectors, (A) 814 and (B) 815, respectively. The electrical signals, $I_a$ and $I_b$, measured by the detectors, (A) 814 and (B) 815, respectively, are provided to the DAQ 816 for processing and analysis. The DAQ 816 may include, in some embodiments one or more processors (CPU) and memories (MEM) configured and operable to analyze and compare the interferences in the received electrical signals, $I_a$ and $I_b$, corresponding to different coherence lengths $lc_1, lc_2$, for determining the distance between the target object 809 and apparatus 800, as described hereinabove using Equation (9) to equation (12).

It is noted that embodiments according to this specific and non-limiting example can be implemented with more than two electromagnetic signal sources, as long as the coherence length of each electromagnetic signal source is different, and this example can duplicate many times for forming a full 3D image (e.g., utilizing a suitable scanning mechanism). It is also noted that though the apparatus in this example is implemented using free space medium to propagate the beams. In other possible embodiment, however, a similar apparatus including a plurality of electromagnetic signal sources having different coherence lengths may be similarly implemented utilizing waveguides (e.g., optical fibers), or combinations of waveguides and free space medium, to propagate the beams. Additionally, in yet another configuration the apparatus 800 can be implemented using a single detector, and an optical switch that may be used to switch between a plurality of signal sources having different coherence lengths, each source used to generate measurement at a dedicated time slot. Using pairs of such measurements performed in different time slots corresponding to respective different coherence lengths can be used to calculate the distance between the target object 809 and the apparatus 800, as described hereinabove.

Additionally, in possible embodiments, additional phase modulators can be alternatively, or additionally, used to modulate the reference beam portions, 810 and 811, or the electromagnetic source beams, 818 and 817. In this example, the lengths of the reference arms can be of equal (or not equal) lengths, depending on the specific design requirements.

Figure 10:
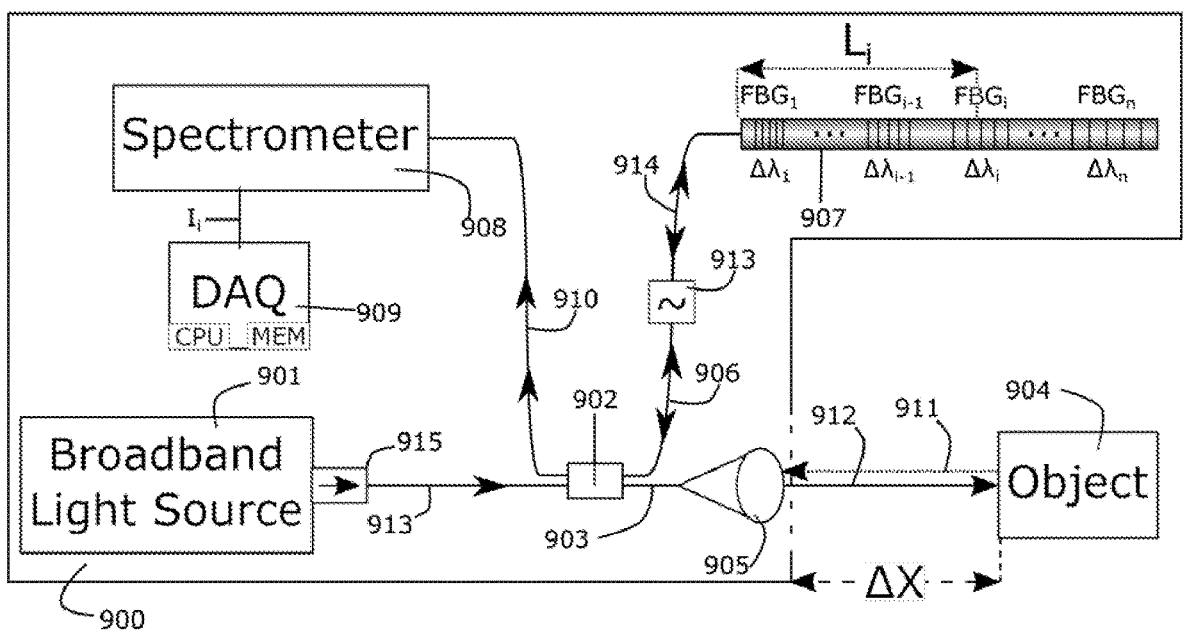
FIG. 10 schematically illustrates a range detection apparatus using broadband source, a FBGA, and a spectrometer, according to some possible embodiments.

In other possible embodiments, the distance measurement (or cross-sectional object characterization) apparatus can be configured to include a wavelength disperser, for example but not limited to, fiber Bragg grating array (FBGA), as illustrated in FIG. 10. The wavelength disperser can be used in the optical/IR regime, but a similar implementation can be made in the RF regime utilizing frequency-dependent transmitting or reflecting components.

The distance measurement apparatus 900 in FIG. 10 includes a broadband signal source 901 configured to transmit an electromagnetic beam, which passes through an isolator 915, the output of which is coupled to the waveguide element 913. The apparatus 900 includes the signal source 901, a splitting arrangement formed by at least one beam splitter 902 and wavelength disperser 907, a detection arrangement including spectrometer 908, and a processing unit 909 (also referred to herein as DAQ). The waveguide elements shown in FIG. 10 may be implemented by, but not limited to, optical fibers. The apparatus 900 includes a beam splitter 902, configured to split the broadband beam passed through the waveguide element 913 into two portions; a broadband interrogating beam portion passing through the waveguide element 903, and a broadband reference beam portion passing through the waveguide element 906.

The broadband interrogating beam portion passed through the waveguide element 903, can be directed through free space medium by a directing optics 905 (e.g., including collimation/focusing elements) towards the target object 904, thereby forming collimated broadband interrogating beam 912. The collimated broadband interrogating beam 912 illuminates the target object 904, and broadband reflected interrogating beam portion 911 is received in the apparatus 900 e.g., by the same directing optics 905. Alternatively, the collimated broadband reflected interrogating beam portion 911 may be collected by specific collection optics (not shown).

In this specific and non-limiting example, the collimated broadband reflected interrogating beam 911 is coupled into the waveguide element 903 using directing optics (e.g., collimator 905), that propagates towards the beam splitter 902. A portion of the interrogating reflected beam that passes the beam splitter 902 is directed through the waveguide element 910 towards the spectrometer 908. The broadband reference beam portion passed through the waveguide element 906, is optionally phase modulated using, for example but not limited to, Electro-Optic, Acousto-Optic, or piezo-electric based modulation, of the phase modulator 913. The modulated broadband reference beam portion from the phase modulator 913 can be passed through waveguide element 914 into a number of wavelength-dependent reflectors, where each group of the wavelength is time delayed by different amount i.e., due to the broad spectrum of the signal source 900, wavelength-sensitive reflectors can be placed in the optical path such that each wavelength-sensitive reflector is positioned at a different location (e.g., as can be achieved utilizing Bragg grating element. This way, each group of wavelengths is reflected from a different position and thereby accumulates a different OPL.

This process can be carried out using a fiber Bragg grating array (FB GA) element to implement the wavelength disperser 907, where each group of wavelengths is reflected back by a specific Bragg grating located at a different position along the fiber. Thus, N Bragg gratings along the FBGA element form N wavelength groups/beam portions associated with a specific wavelength band $\Delta\lambda_i$, (i=1, . . . , N) (where N>1 is an integer). Each wavelength beam portion introduced into the FBGA element 907 experiences a different time delay corresponding to a different optical path $L_i$ caused by the i-th FB GA. The reflected beam that is backreflected by the FBGA element 907 into the waveguide element 914 constitutes a combined reference beam formed of N reflected, separately delayed beam portions (wavelength groups). The combined reference beam back-reflected through the waveguide element 914 is optionally additionally modulated using the phase modulator 913. The back-reflected and optionally modulated combined reference beam is passed through the waveguide element 906, in which it propagates back towards the beam splitter 902.

The beam splitter 902 receives and combines the broadband reflected interrogating beam 911 (passed via waveguide element 903) and the broadband combined reference beam (passed via waveguide element 906) and directs them, superimposed, towards the spectrometer module 908. Specifically, the broadband combined reference beam passed through the waveguide element 910 is formed by N superimposed beam portions, each having a separate wavelength sub-band $\Delta\lambda_i$, (i=1, . . . , N) and a different time delay due to length difference $L_i$, (i=1, . . . , N) associated therewith. The broadband reflected interrogating beam portion is superimposed with the combined broadband reference beam passed through the waveguide element 910.

The spectrometer 908 may include a wavelength dependent beam splitter (not shown e.g., a grating) and wavelength dependent signal detector (not shown), configured to separately measure each of the wavelength groups. The detected signals $I_i$ generated by the spectrometer 908 are transferred to the DAQ 909 for processing and analysis. In some embodiments, the DAQ 909 includes one or more processors (CPU) and memories (MEM) configured and operable to determine the distance $\Delta X$ between the apparatus 900 and the target object 904, using any of the techniques described herein.

This way, splitting the combined beam into N wavelength bands facilitates identification of N wavelength dependent wave groups in the reflection of the interrogating beam that are passed through the waveguide element 910. The reflected wave groups are respectively combined with N different reference wavelengths (and time delay) dependent optical arms of the reference beam. The effective different wavelength dependent optical arms form N wavelength dependent interferences, each interference is the interference of the superimposed i-th component of the reflected interrogating beam portion with the i-th reference beam portion, forming each of the wavelength bands.

In accordance with Equation (4) hereinabove, with the required changes, the detected signal power at the i-th detected wavelength band $I_i$, (i=1, . . . , N) can be expressed as follows:

$$I_i = \frac{1}{4}\left[ I_{Ri} + \eta_{si}I_{si} + 2 \cdot \sqrt{I_{Ri}\eta_s I_{si}} \cdot \cos(\varphi_i) \cdot e^{-\frac{\Delta k_i^2}{8}\cdot(\Delta x - L_i)^2} \right] \quad (13)$$

where $\Delta x$ is the distance to the target, and where, with respect to the i-th wavelength band, $I_{Ri}$ denotes the power intensity directed to the respective reference arm with respect to the i-th wavelength band, $I_{Si}$ denotes the power intensity directed to the reflected interrogating beam 911 with respect to the i-th wavelength band, $\eta_s$ denotes the effective coupling efficiency of the reflected interrogating beam 911 at the spectrometer 908, $\varphi_i$ denotes the relative phase between the respective reference signal $I_{Ri}$, and the reflected interrogating beam $I_{si}$ with respect to the i-th wavelength band, $L_i$ denotes the relative length delay of the respective reference signal for the i-th wavelength band with respect to the position of the i-th FBGA element, and $\Delta k_i$ denotes the bandwidth reflected by the ith FBG element.

Though the apparatus 900 is illustrated using a fiber-based system for simplicity it can also be implemented in a free-space based system e.g., by utilizing diffraction gratings instead of the FBGA.

Figures 11, 13:
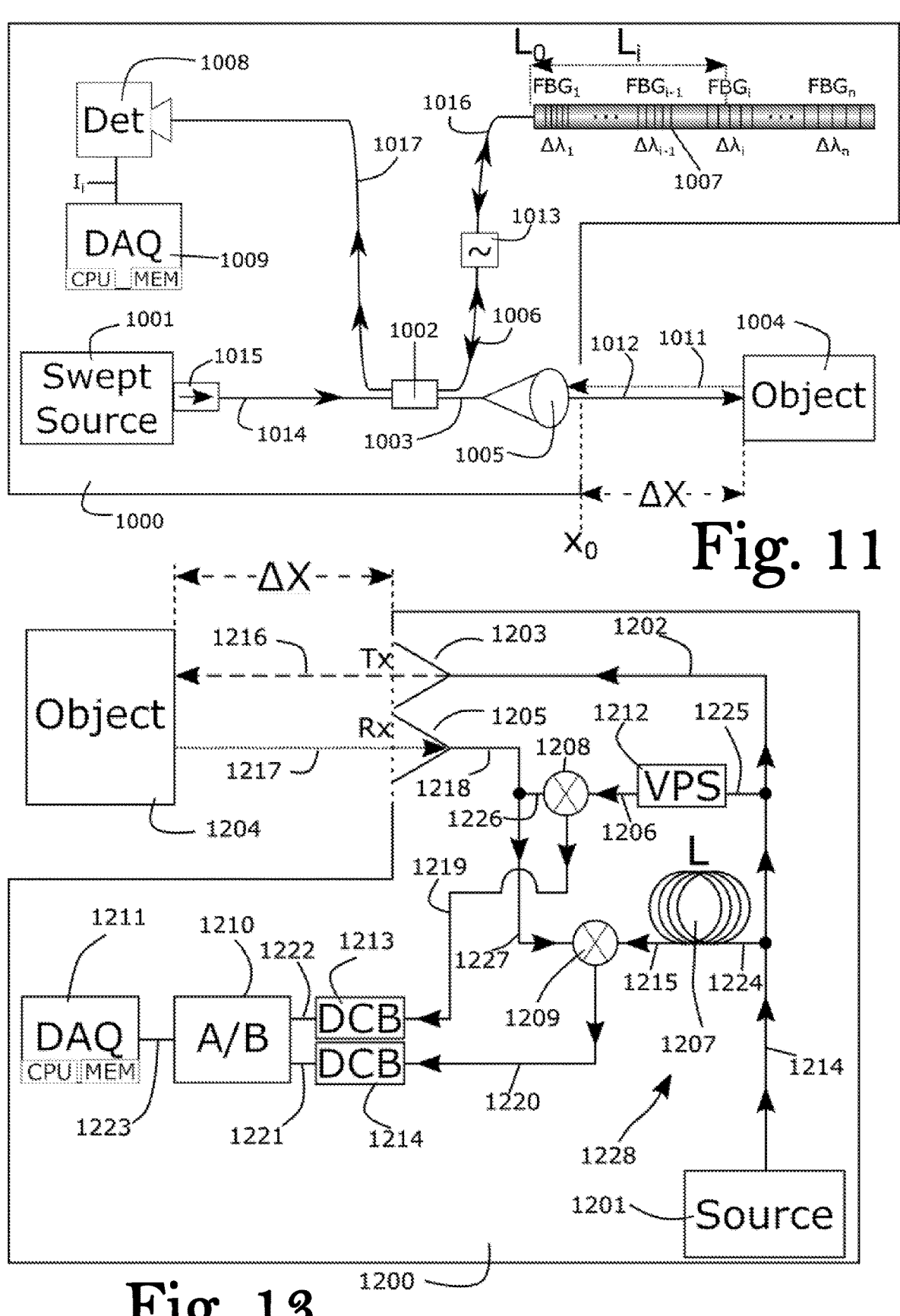
FIG. 11 schematically illustrates a range detection apparatus using a swept source, a fiber Bragg grating array (FBGA), and a single detector, according to some possible embodiments.
FIG. 13 schematically illustrates a range detection apparatus using source in the RF regime and conventional RF components, according to some possible embodiments.

In some possible embodiments a distance measurement apparatus 1000 disclosed herein and illustrated in FIG. 11, is operated utilizing a swept-source 1001 instead of a broadband source (like 901 in FIG. 10). The apparatus 1000 includes the signal source 1001, a splitting arrangement formed by at least one beam splitter 1002 and wavelength disperser 1007, a detection unit 1008, and a processing unit 1009 (also referred to herein as DAQ). The detection unit may utilize a spectrometer or wavelength sensitive detector enabling selective detection of light of the N wavelength bands used.

Each beam generated by the swept-source 1001 has a narrow-bandwidth centered about a central wavelength that can be changed at different time instances (swept). The distance measurement apparatus 1000 may further include a wavelength disperser, for example, but not limited to, fiber Bragg grating array (FBGA), to be used in the optical/IR regime. If the signals produced by the swept source are RF signals, a frequency-dependent transmitter (not shown) coupled to a frequency dependent reflector component can be used instead of the FBGA. This way, the time delay obtained for each beam produced by the swept source 1001 is dependent on the instantaneous central wavelength of the produced beam (due to the FBGA wavelength sensitivity).

In this specific and non-limiting example, a plurality of signals, each associated with a certain distance between the apparatus 1000 and a target object 1004, are sequentially generated by the swept signal source 1001. A corresponding plurality of references beams signals having different wavelength bands and respective time delays are generated and superimposed with interrogating beams signals of respective central wavelengths reflected from the target object 1004 to produce wavelength dependent interference signals indicative of the distance between the target object 1004 and the apparatus 1000.

The swept-source 1001 may have a relatively narrow linewidth for transmitting a wavelength-swept electromagnetic beam passed into the waveguide element 1014 after passing through the isolator 1015. The waveguide elements of apparatus 1000 may be implemented by, for example, optical fibers. The wavelength-swept beam passed through the waveguide element 1014 is split by the beam splitter 1002 into two portions: a wavelength-swept interrogating beam portion passed into waveguide element 1003; and a wavelength-swept reference beam portion passed into waveguide element 1006. The wavelength-swept interrogating beam portion from the waveguide element 1003 may be directed by directing optics (e.g., using a collimator/focusing means) 1005 through free space medium towards the target object 1004, thereby forming a wavelength-swept interrogating collimated beam 1012. The wavelength-swept electromagnetic interrogating collimated beam 1012 illuminates the target object 1004, and a reflected portion thereof 1011 is received in the apparatus 1000 e.g., by the same directing optics 1005. Alternatively, or additionally, the reflected wavelength-swept interrogating beam 1011 may be collected by specific collection optics (not shown).

In this specific and non-limiting example, the reflected wavelength-swept interrogating beam 1011 is coupled into the waveguide element 1003 using the collimator 1005, to form the reflected interrogating beam propagated towards the beam splitter 1002. A portion of the wavelength-swept reflected interrogating beam 1011 that passes through the beam splitter 1002 is passed through the waveguide element 1017 to form the beam projected therefrom onto the detector (Det) 1008. The wavelength-swept reference beam portion passed through the waveguide element 1006 is optionally phase modulated using, for example but not limited to, Electro-Optic, Acousto-Optic, or piezoelectric based modulation, of the phase modulator 1013. The modulated reference beam from the phase modulator 1013 is passed through the waveguide element 1016 and directed into, and back-reflected by, the wavelength disperser (FBGA element) 1007. The reflection obtained from the FBGA element 1007 is dependent on the instantaneous central wavelength of the beam produced by the swept-source 1001, and therefore the time delay thereby obtained is wavelength-dependent, as it is reflected back by a specific Bragg grating located at a different position $L_i$ along the optical fiber element.

The time delay of the wavelength-swept reference beam back-reflected from the FBGA element 1007 through the waveguide element 1016 depends on the instantaneous central wavelength $\lambda_s(t)$ of the swept signal source 1001. In case the central wavelength $\lambda_s(t)$ of the swept signal source 1001 is found to be in the reflective-responsivity-range of the i-th FBGA located at $L_i$, the delay will be $2L_i$ relatively to the entrance point of the FBGA element 1007 at $L_0$. Knowing the instantaneous central wavelength $\lambda_s(t)$, the effective instantaneous reference arm length and its respective length different $2L_i$ is also well-known.

The wavelength-swept reference beam back-reflected from the FBGA element 1007 through the waveguide element 1016 is again, optionally, modulated using the phase modulator 1013, and passed therefrom through the waveguide element 1006 back towards the beam splitter 1002. A portion of the wavelength-swept back-reflected reference signal that passes the beam splitter 1002 is directed through the waveguide element 1017 to the detector 1008. The wavelength-swept reflected interrogating beam portion that passes through the waveguide element 1003, and the swept back-reflected reference signal portion that passes through the waveguide element 1006, are superposed by the beam splitter 1002, and passed therefrom through the waveguide element 1017 and thereby projected onto the detector 1008. The beam superimposed at the splitter 1002 are electrically measured by the detector 1008, and the measured signal is processed and analyzed using one or more processors (CPU) and memories (MEM) of the DAQ 1009.

The distance between the apparatus 1000 and the target object 1004 can be determined in similar technique as described hereinabove with reference to FIGS. 2, 3, 4 and 10, where each FB GA element acts as a delay line with a different length enabling the apparatus 1000 to determine different distances of multiple target objects 1004 (like OCT). The distances can be determined in the same manner as carried out utilizing the apparatuses 900 in FIG. 10. However, in apparatus 1000 the detected signals L are not the outputs of i-th detectors in the spectrometer, but rather time-dependent signals sequentially produced by the swept source 1001 i.e., a single detector 1008 is used instead of a detector array (each detector for each FBGA), and the measurement data L is time-dependent (each reference signal is reflected by different FB GA imparting a different time delay). In some embodiments the apparatus 1000 is implemented using a fiber-based (optic) waveguides for simplicity, but it can also be implemented in a free-space medium to communicate the beam therein.

In embodiments disclosed hereinabove, an interrogating beam having a specific field of view (FOV) (determined by the beam width e.g., having certain direction and angular deviation/range) is used, and in such case, it may illuminate a specific FOV from which the interrogating beam portion is reflected back towards the apparatus to provide information indicative of the direction and distance of the target object located in the specific FOV. In order to receive information from other fields of view determined by other directions (e.g., for 3D mapping/imaging), embodiments such as those disclosed hereinabove may implement a scanning mechanism is typically used in the transmission of the interrogating beam (e.g., one beam with a scanning mechanism, which may be configured to scan and successively illuminate a large field of view, or by multiple transmuting transmission arrays wherein each interrogating beam in the array is configured to illuminate a small field of view, or by a very wide beam—such as a flash source). In such embodiments, the scanning mechanism may also be used in the collection/acquisition of reflections of the interrogating signal from the fields of view.

Figure 12:
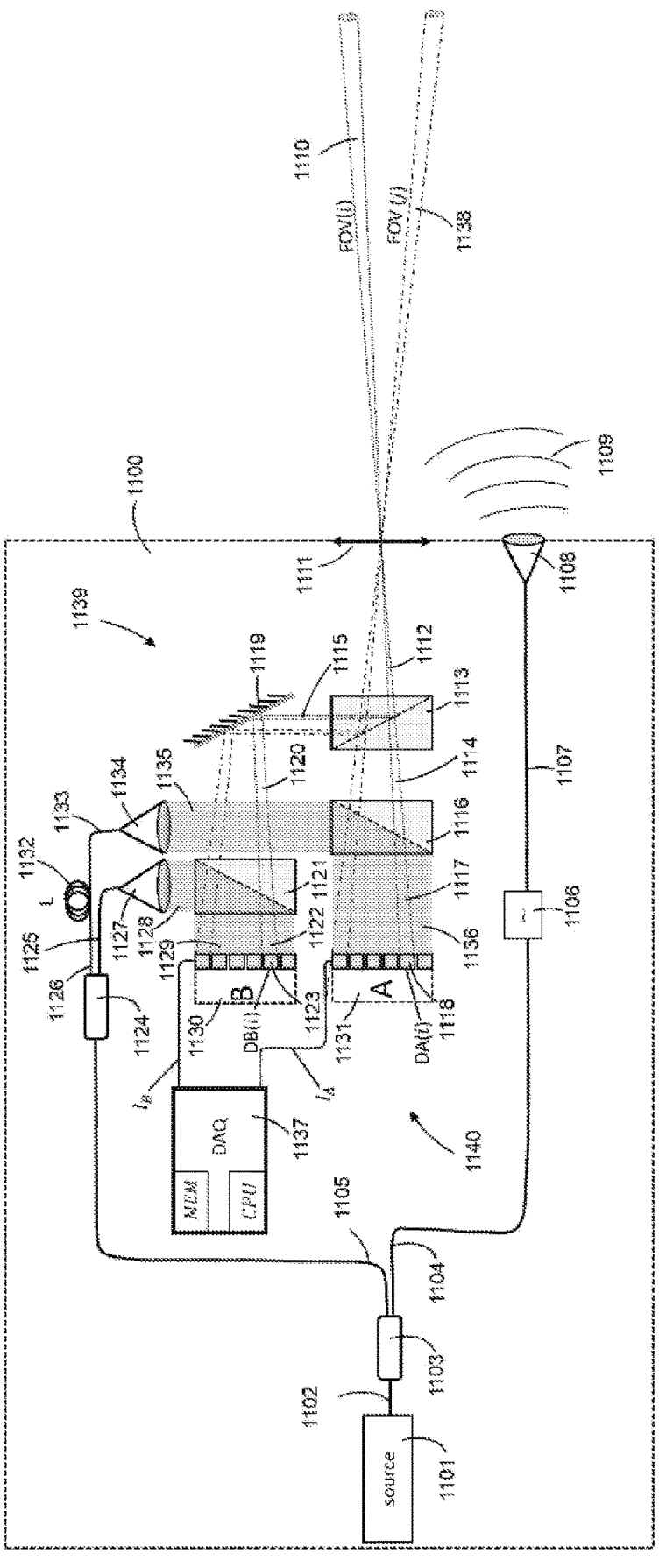
FIG. 12 schematically illustrates a three-dimensional (3D) implementation of a range detection apparatus using an array of detectors, according to some possible embodiments.

The apparatus 1100 illustrated in FIG. 12 exemplifies a 3D mapping/imaging technique that uses imaging of a field of view on at least one detector array and does not necessarily require scanning mechanisms in the transmission/acquisition portions of the apparatus. The apparatus 1100 includes signal source 1101, a splitting arrangement 1139 comprising splitters 1103, 1124 and 1113, combiners 1116 and 1121, a detection arrangement 1139 comprising array detectors 1131 (A) and 1130 (B), and a processing unit 1137 (also referred to herein as DAQ). For each specific field of view covered by the general field of view of the apparatus 1100 there is a dedicated detector (in the detector array) that collects the reflected interrogating beam from its specific field of view, which thereby facilitates construction of a full 3D image.

FIG. 12 schematically illustrates an apparatus 1100 utilizing a detector array A, B, to image a full scene without scanning the reflected signal, wherein the transmitting signal can be for example a "flash", a wide beam illuminating the general FOV at once (typically not in the visible wavelength e.g., about 0.7 um to 2 um) or a beam directed to illuminate a specific FOV. More particularly, a region of interest is being illuminated by an interrogating beam 1109 (e.g., a very wide beam, or narrow beam directed by a scanning mechanism) generated by the apparatus 1100, the interrogating beam 1109 having an angular field of view (FOV) that may illuminate target object (not shown) located at some distance from the apparatus 1100. In this specific and non-limiting example, the collection optics 1111 is implemented by imaging optics configured to collect a plurality of reflected beams 1110,1138 . . . , that are the reflections of the interrogating beam 1109 from the FOV of the apparatus 1100. This configuration enables pixel-by-pixel range detection within an image of a field of view, enabling to determine distances of different objects within the field of view.

The reflected beams, 1110,1138 . . . , are directed to the imaging optics 1111 from more than one direction, defined by the fields of view associated with the different detector cells such as FOV(i), FOV(j). The imaging optics 1111 is configured to image/direct reflection beams from different directions onto two detector arrays, A and B, wherein for each FOV such as 1110, there are respective conjugated detector elements 1118,1123 in each of the detector arrays A and B, i.e., each detector in each array is associated with a different direction/angle of arrival from which a reflected beam may originate. Coupling the direction of each reflection beam and the distance from which the reflection beam originates enables construction of a 3D map of the illuminated FOV. In general, it should be noted that a distance mapping system according to some possible embodiments may alternatively combine different mechanisms (not shown), such as but not limited to, scanning mechanism with a focused/collimated beam, or with a narrow field of view, or using an interrogating beam having a wide field of view.

In some embodiments, apparatus 1100 includes an electromagnetic signal source 1101 configured to generate an electromagnetic beam having a finite coherence length for passage through a waveguide element 1102. The waveguide elements of the apparatus 1100 may be implemented by optical fibers. The beam passed through the waveguide element 1102 is split by the beam splitter 1103 to form an interrogating beam portion passed through the waveguide element 1104, and a reference beam portion passed through the waveguide element 1105. The interrogating beam portion passed through the waveguide element 1104, is optionally phase modulated using, for example but not limited to, Electro-Optic, Acousto-Optic, or piezoelectric based modulation, of the phase modulator 1106, to thereby form the optionally modulated interrogating beam passed through the waveguide element 1107.

The source output signal, being modulated or not by phase modulator 1106, is transmitted through wave guide element 1107 and directed by the directing optics (e.g., collimator) 1108 to form the interrogating beam 1109 that propagates through free space medium to illuminate a selected field of view FOV. In this connection, the field of view FOV, is typically determined by the directing optics 1108 and may in some configurations be the same as FOV of the collection optics 1111. The interrogating electromagnetic beam 1109 propagates towards the FOVs such as 1110,1138, and some portion thereof may be reflected from an object(s) located within the FOVs 1110,1138. A portion of the reflected beam is received by the collection optics 1111 from the respective direction in the apparatus 1100 to form the received reflected interrogating beam portion 1112. It should be noted that generally the FOV of illumination determined by the directing optics 1108 may be different than the FOV of light collection determined by the collection optics 1111. For example, in some embodiments, the directing optics 1108 may be configured to illuminate an entire field in "flash like" illumination, while the collection optics 1111 may be configured to scan the FOV pixel by pixel. In some embodiments the collection optics may be configured for collection of light from a region of the FOV.

The received reflected interrogating beam portions, such as portion 1112, are split by the beam splitter 1113 into first reflected interrogating beam portions 1114, and second reflected interrogating beam portions 1115. The first reflected interrogating beam portions 1114 are further directed onto an additional beam combiner 1116, to thereby form reflected beam portions 1117 projected onto respective detectors DA(i) 1118, located in the detector array (A) 1131. It is noted that the specific detector onto which the beam is projected depends on the direction from which the reflected beam 1110 is reaching the apparatus 1100, and therefore it provides information required to build a 3D map of the interrogated FOV. As will be elaborated below, the beam combiner 1116 forms a combined reflected beam 1117 that is superimposed with a portion of the collimated long arm reference beam 1136.

The second reflected interrogating beam portions 1115 are directed onto a reflector (e.g., mirror) 1119, and reflected therefrom to form the reflected beam portions 1120, which passes an additional beam combiner 1121. As will be elaborated below, a portion of the reflected beam portions 1120 from the reflector 1119 is superimposed by the beam combiner 1121 with a portion of the substantially uniform short arm reference beam 1129 to form the combined beam. The combined beam is projected from the combiner 1121 onto the detector DB(i) 1123, located in the detector array (B) 1130. As noted above with regard to beam portions 1117, 1122 projected onto the detectors 1118, 1123 is projected depends on the direction from which the reflected beam 1110 is reaching the apparatus 1100, and therefore it provides information required to build a 3D map of the interrogated FOV.

The reference beam portion passed through the waveguide element 1105 is split by the beam splitter 1124 and directed into a short reference arm and a long reference arm forming a short arm reference beam portion passed through the waveguide element 1125, and a long arm reference beam portion passed through the waveguide element 1126.

The short arm reference beam portion passed through the waveguide element 1125 is collimated by the collimator 1127 to form the short reference arm collimated beam 1128 which is combined by the beam combiner 1121 with the reflected beams 1120 . . . , to thereby form the short arm combined beams 1129 . . . . The short arm combined beam 1129 is directed from the beam combiner 1121 onto the detector array (B) 1130.

The long arm reference beam portion from the waveguide element 1126 is passed through delay line 1132, thereby forming the delayed reference beam passed through the waveguide element 1133, which is time delayed by the additional length L of the delay line 1132, with respect to the short reference arm. The time delayed reference beam passed through the waveguide element 1133 is then collimated by the collimator 1134, to thereby form the long arm collimated reference beam 1135, which is directed through the free space medium to the beam combiner 1116. The beam combiner 1116 combines the long arm collimated reference beam 1135 with the first reflected interrogating beam portions 1114, which are thereby directed onto the detector array (A) 1131.

The reflected interrogating beam portions, 1117 and 1122, and the reference beam portions, 1136 and 1129, are superposed on the detectors DA(i) 1118 and DB(i) 1123 in the detector arrays, 1131 and 1130 respectively, and the signals, $I_A$ and $I_B$, thereby measured electrically are transferred to the DAQ 1137 for analysis and processing e.g., by one or more processor (CPU) and memories (MEM) thereof. Thus, the measured signal $I_A$ transferred to the DAQ 1137 is indicative of the interference of the reflected interrogating beam portions 1117 . . . with the collimated long reference arm beam portion 1136, which is substantially localized at detector DA(i) 1118, and the measured signal $I_B$ transferred to the DAQ 1137 is indicative of the interference of the reflected interrogating beam portion 1122 with the collimated short reference arm beam portion 1129, which is substantially localized at detector DB(i) 1123. In particular, in accordance with equations (6) and (7), with the required changes, the detected signals, $I_A$ and $I_B$, can be used to determine the distance between the apparatus 1100 and one or more of the target objects in the interrogated FOV.

Since for every reflected beam reaching the imaging optics 1111 from a corresponding direction/FOV the interaction with the substantially uniform short (or long) reference arm beam is substantially localized, the detected signal is localized at, or at the vicinity of a corresponding specific detector in the detector array. Consequently, the detected signals provide information from which a 3D map of the interrogated FOV may be derived by the DAQ 1137 which combines the information from the detector arrays 1130 and 1131, e.g., using equation corresponding to equations (4) to (8) for comparing the detected signals generated by corresponding detectors. This way, by using all detection elements (pixels) in the detector arrays, an image of the full scene/FOV can be established.

It should be noted that for the clarity and simplicity of the explanation of the example the effect of one reflected beam 1110, indicative of a target object at FOV(i), is elaborated, however, a plurality of reflections from different directions may reach the imaging optics, either simultaneously or non-simultaneously. This is illustrated in the figure by reflected beam 1138 impinging at the imaging optics 1111, from a different direction/different field of view FOV(j) and subsequently at detector array (A) 1131 and detector array (B) 1130 at different detector positions, which are indicative of the direction of the reflected beam 1138. It is noted that although the apparatus 1100 is exemplified in FIG. 12 without any beam scanning mechanism(s) (for the beam illumination and/or collection), any combination of scanning mechanism(s), and scanning-free variants, for the signal beam illumination and collection can be used in possible embodiments of the apparatus 1100.

FIG. 13 schematically illustrates a distance measurement apparatus 1200, wherein a radio frequency (RF) signal source 1201 is used to measure the distance between the apparatus 1200 and a target object 1204. The apparatus 1200 comprises the signal source 1201, a splitting arrangement 1228 comprising mixers 1208 and 1209 and splitters implemented by interconnections of the waveguide elements described below, a detection arrangement comprising Rx antenna 1205, and a processing unit 1211 (also referred to herein as DAQ). In this specific and non-limiting example RF signal generated by the RF signal source 1201 is passed through a waveguide element 1214. The RF signal passed through the waveguide element 1214 is split into first, second and third, RF signals portions passed through the waveguide elements 1202, 1224, 1225, respectively.

The first RF signal portion from the waveguide element 1202, used as the interrogating signal, is transmitted towards the target object 1204 using the Tx antenna element 1203. The electromagnetic interrogating RF beam 1216 transmitted from the Tx antenna element 1203 propagates through free space medium towards the target object 1204, and a reflected portion thereof 1217 is received by the Rx antenna element 1205 of the apparatus 1200. The received reflected interrogating RF signal portion 1217 received by the Rx antenna element 1205 and is passed through the waveguide element 1218, wherefrom it is split into first and second reflected RF interrogating signal portions passed through the waveguide elements 1226 and 1227, respectively.

The second RF signal portion passed through the waveguide element 1224, and the third RF signal portion passed through the waveguide element 1225 are used as reference signals. The second RF reference signal portion from the waveguide element 1224 is time delayed by the delay line 1207 of the long reference arm configured to affect an additional length L with respect to the length of the short reference arm at 1225, through which the third RF reference signal portion is passed. The phase of the second RF reference signal portion from the waveguide element 1225 can be controlled by a Variable Phase Shifter (VPS) 1212, wherefrom the third RF reference signal portion is passed to the waveguide element 1206 of the short reference arm.

The reflected interrogating RF signal portions from the waveguide elements 1226 and 1227 are mixed by the mixer units, 1208 and 1209 respectively, with the reference RF signal portions from the waveguide elements 1206 and 1215, of the short and long reference arms, respectively. The short and long mixed RF signals are passed from the mixer units 1208 and 1209 through the waveguide elements 1219 and 1220, to the filtering units 1213 and 1214, respectively.

The DC components of the mixed short and long RF signals passed through the waveguide elements 1219 and 1220 (the constant/distance-independent terms) are filtered by the DC blockers (DCB) 1213 and 1214 respectively. The filtered signals from the DC blockers 1213 and 1214 are passed via the waveguide elements 1222 and 1221 respectively, to the signal dividing unit 1210 configured to determine the ratio of the coherence terms of the mixed short and long RF signals. The output signal 1223 from the divider unit 1210 is used as the ratio Γ parameter by the DAQ 1211, for determining the distance between the apparatus 1200 and target object 1204 e.g., using one or more processors (CPU) and memories (MEM) configured and operable to compute the distance according to Equation (8). This specific and non-limiting example can be implemented by a different hardware and analysis means. While described herein using delay lines with different lengths similar to the apparatuses described herein with reference to FIGS. 2 and 5 etc., this technique can be implemented using multiple signal sources with different coherence lengths, or using one signal source with varying coherence lengths, such as illustrated in FIGS. 8 and 9.

Figure 14:
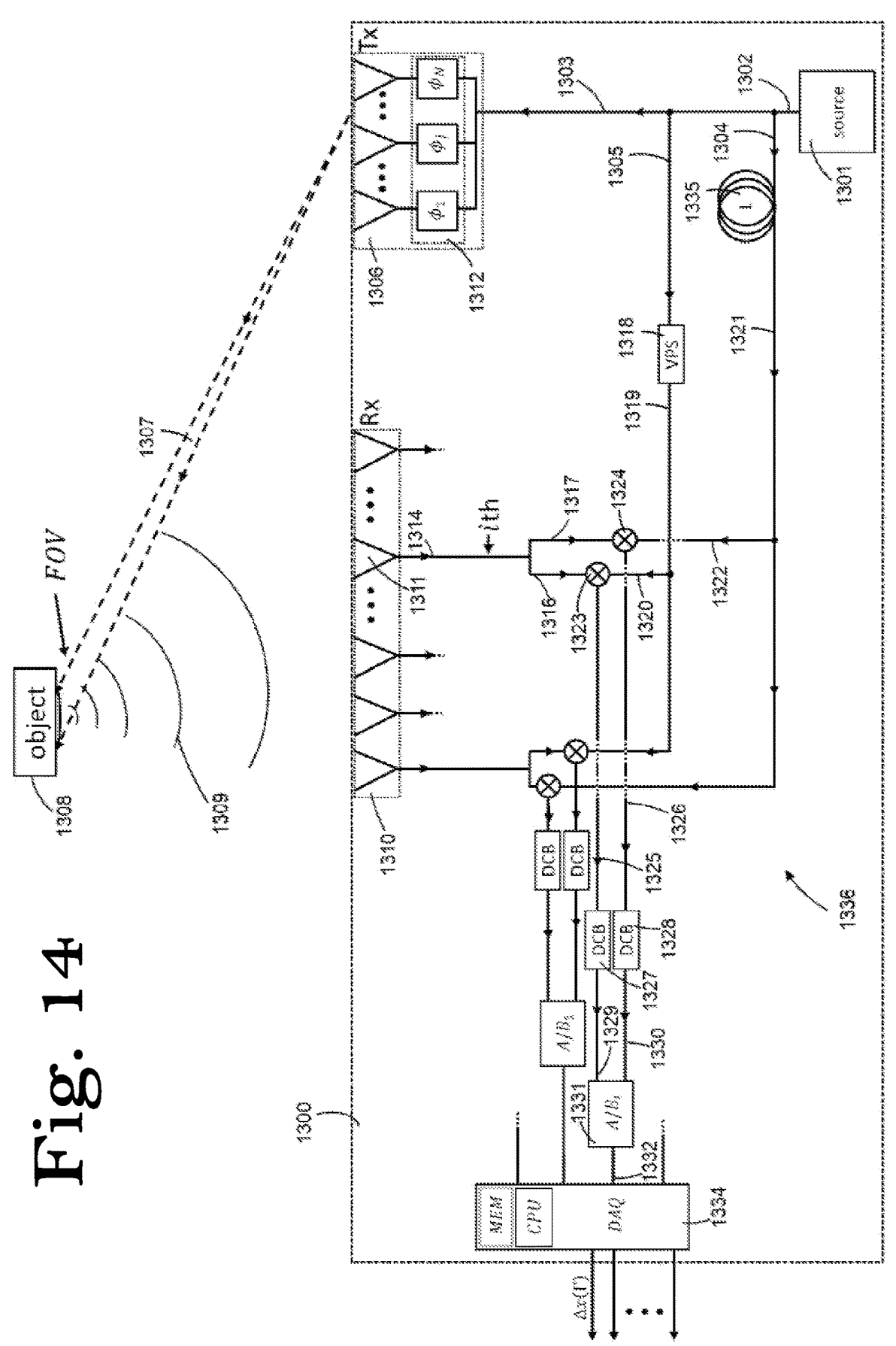
FIG. 14 schematically illustrates a range detection apparatus using a phased antenna array, a signal source in the RF regime, and conventional RF components, according to some possible embodiments.

FIG. 14 schematically illustrates an imaging apparatus 1300, wherein radio frequency (RF) signals are used to measure a distance between the apparatus 1300 and a target object 1308, and a phase array detection unit is used to construct a 3D image for the interrogated target object 1308. According to different embodiments illustrated with respect to the figure the direction of the interrogating beam may be controlled during transmission by controlling a transmission added phase, added to the transmitted signal in each element in a transmission phase array (Tx antenna elements of the transmitter 1306), forming an RF interrogating signal 1307, and the direction from which signal is collected may be controlled by control of a reception added phase added to a collected signal in each reception element in a reception array (i.e. in Rx antenna elements of the array antenna of the receiver 1310), forming a directed reception providing sensitivity and directionality in sensing a reflected portion of the interrogating signal 1309. As described in more detail below, the collected reflected portion of the interrogating signal 1309 is mixed with at least two reference signals having different paths or different coherence length and further processed to estimate the distance of the target object. The apparatus 1300 comprises signal source 1301, a splitting arrangement 1336 comprising mixers 1323/1324 . . . and splitters implemented by interconnections of the waveguide elements described below, a detection arrangement comprising receiver 1310, and a processing unit 1334 (also referred to herein as DAQ).

The apparatus comprises an RF signal source 1301 configured to generate and propagate RF signals into a waveguide element 1302 coupled thereto. The RF beam passed through the waveguide element 1302 is split into first, second, and third RF signal portions passed through the waveguide elements 1305, 1304, and 1303, respectively. The third RF portion from the waveguide element 1303, used as RF interrogating signal 1307, is transmitted through free space medium towards the target object 1308 by the Tx array antenna of the transmitter 1306. The transmitter 1306 includes a phase control unit (PCU) 1312 configured to control the relative phase between the Tx antenna elements of the transmitter 1306, thereby enabling to electrically control the transmitted direction of the interrogating signal through free space medium. As shown, the electromagnetic interrogating beam 1307 propagates towards a specific FOV. The reflected portion of the interrogating signal 1309 is received by one or more Rx antenna elements of the array antenna of the receiver 1310 of the apparatus 1300.

An implementation for an i-th antenna element 1311 (1<i<N, where i is an integer) is described below, which also pertains to the other antenna elements of the Rx array antenna of the receiver 1310. The reflected interrogating RF signal 1309 received by the ith antenna element 1311 is passed through the waveguide element 1314, wherefrom it is split into first and second reflected interrogating RF signal portions passed through the waveguide elements 1316 and 1317, respectively.

The first RF signal portion passed through the waveguide element 1305, and the second RF signal portion passed through the waveguide element 1304 are used as first and second reference RF signals, respectively. The second reference RF signal portion from the waveguide element 1304 is passed through a long reference arm in which it is time delayed by the delay waveguide line 1335 by an additional length L, by which its length is greater than the length of the short reference arm used for the passage of the first reference RF signal portion passed through the waveguide element 1305. In some embodiments the phase of the first reference RF signal portion from the waveguide element 1305 is controllably shifted in the short reference arm by a variable phase shifter (VPS) 1318. The first reference RF signal portion is passed through the waveguide element 1319, and the time delayed second reference RF signal from the delay waveguide line 1335 is passed through the waveguide element 1321.

The optionally phase shifted reference RF signal from the waveguide element 1319 of the short reference arm, and the time delayed reference RF signal from the waveguide element 1321 of the long reference arm, are each split into N RF signal portions of respective RF signal propagation channels of the apparatus 1300, each one of these N signal propagation channels corresponds to a respective one of the N Rx antenna elements in the array antenna of the receiver 1310. In the i-th RF signal propagation channel, the optionally phase shifted RF reference signal from the short reference arm is passed to waveguide element 1320, and the time delayed RF reference signal from the long reference arm is passed to the waveguide element 1322, which are associated with the i-th Rx antenna element 1311.

The i-th RF signal propagation channel comprises first and second mixer units 1323 and 1324, configured for respectively mixing the first and second reflected interrogating RF signal portions from the waveguide elements 1316 and 1317, with the first (optionally phase shifted) and the second (time delayed) reference RF signal portions from the waveguide elements 1320 and 1322 i.e., that are associated with the short and long reference arms, respectively. The first mixed RF signal from the first mixer unit 1323

(associated with the short reference arm) is passed through the waveguide element 1325, and the second RF mixed signal from the second mixer unit 1324 (associated with the long reference arm) is passed through the waveguide element 1326.

The DC component of the first mixed reference RF signal from the waveguide element 1325 (constant/distance-independent term) is filtered by the DC blocker unit 1327, and the second DC component of the mixed reference signal from the waveguide element 1326 (constant/distance-independent term) is filtered by the DC blocker unit 1328. The filtered first mixed reference RF signal from the DC blocker unit 1327 is passed through the waveguide element 1329, and the filtered second mixed reference RF signal from the DC blocker unit 1328 is passed through the waveguide element 1330. The i-th RF signal propagation channel comprises a divider unit 1331 configured to determine the ratio signal 1332 indicative of the ratio of the coherence terms of the filtered first and second mixed reference RF signals passed through the waveguide elements 1329 and 1330, respectively.

The ratio signal 1332 is used by the DAQ 1334 to determine for the reflected interrogating signal 1309 received in each Rx antenna of the receiver 1310 a respective F parameter denoted by Equation (6), and to thereby determine the distance (depth) $\Delta x(T)$between the apparatus 1300 and the target object 1308 using Equation (8). The DAQ 1334 comprises in some embodiments one or more processors (CPU) and memories (MEM), configured and operable to compute a respective distance from the N RF signal propagation channels corresponding to the N Rx antenna elements in the antenna array of the receiver 1310, while the horizontal position and the height position of the target object 1308 being determined by relative phase between the Rx antenna elements of the receiver 1310.

In this specific and non-limiting example, the horizontal and vertical position of the target object 1308 is related to the angel of arrival of the reflected interrogating beam portion 1309 from the FOV. This angel of arrival causes a relative phase shift to the reflected portion of the interrogating signal 1309 detected by the different antennas in the antenna array elements of the receiver 1310. Using this information, reconstruction of the 3D image is done by processing and analyzing the different amplitudes (caused by the phase shift's) of the received RF signals corresponding to the different Rx antenna element in the array antenna of the receiver 1310, by the DAQ units 1334.

In this specific and non-limiting example, the transmitting beam angle can be broad or narrow, and it can be directed with a reorienting mechanism (not shown). In some possible embodiments, the reorienting mechanism and the Tx antenna element of the receiver 1306 can be part of the Rx array antenna of the receiver 1310.

Figure 15:
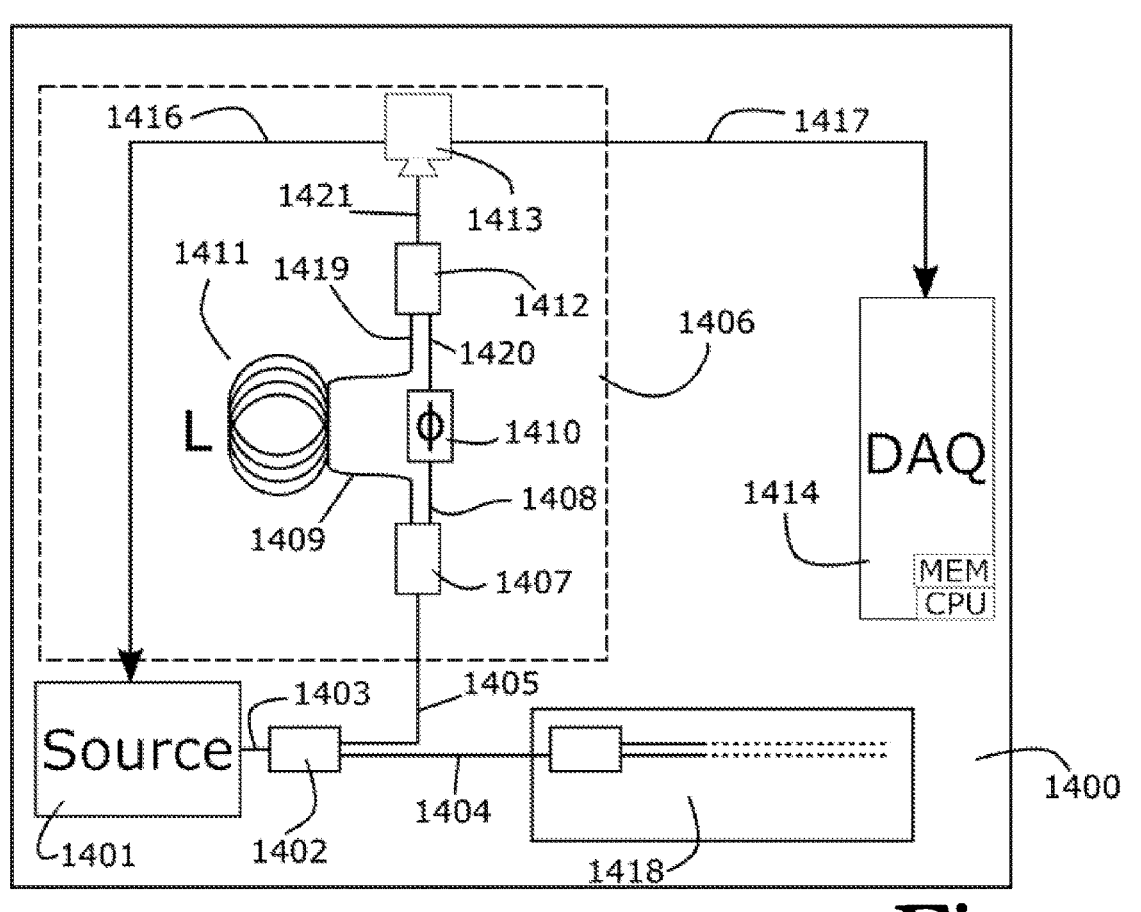
FIG. 15 schematically illustrates a continuous coherence length measurement apparatus, according to some possible embodiments.

In some embodiments a continuous coherence length measurement apparatus 1400, as schematically illustrated in FIG. 15, is used. For each of the previously described distance measurement techniques, a change in the coherence length source might occur in some cases, hence a continuous measurement of coherence length e.g., as exemplified in FIG. 15, might ease calculations, and increase performance.

The apparatus 1400 comprises a signal source 1401 configured to generate an electromagnetic beam that is passed through the waveguide element 1403. The waveguide elements used in apparatus 1400 may be implemented by, for example, but not limited to, optical fibers. The beam passed through the waveguide element 1403 is split by beam splitter 1402 into two portions: an interrogating beam portion passed through the waveguide element 1404; and a feedback beam portion passed through the waveguide element 1405 to a feedback loop unit 1406. The interrogating beam portion passed through the waveguide element 1404 is used to illuminate a target object (not shown), and/or a FOV, for determining a distance to said target object using any of the techniques/apparatuses described herein. The feedback beam portion passed through the waveguide element 1405 is used to evaluate the instantaneous coherent length of the signal source 1401 by the feedback loop unit 1406.

The feedback beam portion from the waveguide element 1405 is split by beam splitter 1407 into two portions: a short arm portion passed through the waveguide element 1408; and a long arm portion passed through the waveguide element 1409. The short arm beam portion from the waveguide element 1408 is optionally modulated by a phase modulator 1410, comprising for example but not limited to, Electro-Optic, Acousto-Optic, or piezoelectric based modulator. The long arm beam portion from the waveguide element 1409 is time delayed by an additional length L of a delay waveguide line 1411, where L is the difference between the lengths of the long and short beam arms. The beam portions from the long and short beam arms (1419, 1420) are superposed by beam combiner 1412, and the superposed signal from the beam combiner 1412 is passed through the waveguide element 1421 to the detector 1413. The signal 1416 measured by the detector 1413 can be used in a feedback loop for stabilizing the coherence length of the signal source 1401. Additionally, or alternatively, the signal 1417 measured by the detector 1413 can be used by the DAQ 1414 for later analysis e.g., by one or more processors (CPU) and memories (MEM) thereof.

This coherence length stabilizing technique can also be implemented using the delay lines existing in the distance measuring apparatuses described hereinabove (e.g., 418, 517, 626, in FIGS. 5, 6, 7).

For example, with reference to FIG. 6, beam splitters may be introduced to act on beams 530 and 531 e.g., after collimators 518 and 519 and before beam splitter 511 and 542, for respectively splitting a first small portion and a second small portion of the respective short-arm and long-arm reference beams to be used for the feedback loop unit 1406. A phase modulator corresponding to phase modulator 1410 may be introduced in the first small portion and/or the second small portion of the respective beams. Combining the first small portion and second small portion of the respective beams allows for direct measurement of the coherence length stability by a dedicated detector (not shown).

Figure 16A:
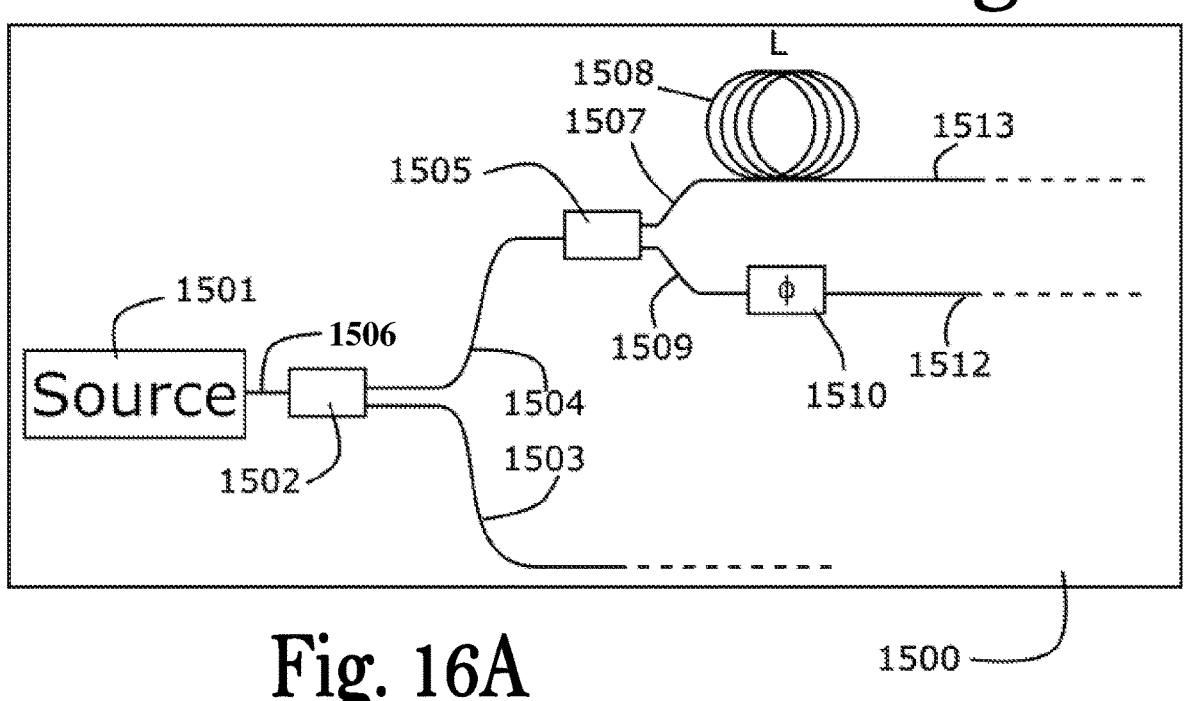
FIGS. 16A and 16B schematically illustrate relative phase correction apparatuses, according to some possible embodiments.

In other possible embodiments a phase correction apparatus 1500, as illustrated in FIG. 16A, is used to ease calculations, and improve measurement speed in the distance detection techniques/apparatuses described hereinabove and hereinbelow.

The apparatus 1500 comprises a signal source 1501 configured to generate an electromagnetic beam passed therefrom through the waveguide element 1506. The waveguide elements in the apparatus 1500 can be implemented by, for example, but not limited to, optical fibers. The beam from the waveguide element 1501 is split by the beam splitter 1502 into two portions: (i) an interrogating beam portion passed through the waveguide element 1503; and (ii) a reference beam portion passed through the waveguide element 1504.

The interrogating beam portion from the waveguide element 1503 is used to illuminate a target object (not shown), and/or a FOV, and measure distance to said object by any of the techniques/apparatuses described herein. The reference beam portion from the waveguide element 1504 is split by the beam splitter 1505 into a long arm beam portion passed through the waveguide element 1507, and a short arm beam portion passed through the waveguide element 1509. The long arm reference beam portion from the waveguide element 1507 is delayed by an additional length L of the delay line 1508 i.e., the difference between the lengths of the long and short reference arms equal to L.

In order to control the relative phase between the short and long reference arm signals (1513 and 1512), for example, but not limited to, a phase modulator 1510 can be used in a closed, or open, loop configuration with the previously described detection unit, or with an additional detection unit (i.e., the relative phase can be determined from measurements obtained from the detection units used in the distance detection apparatuses described herein).

Figure 16B:
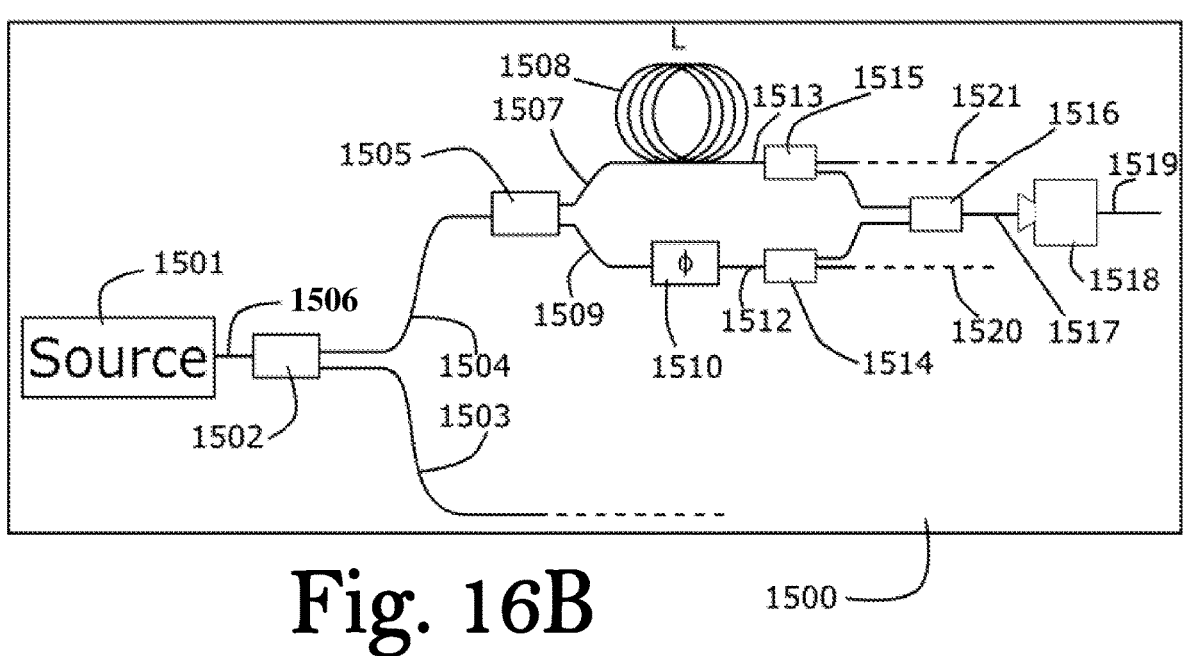

Alternatively, as exemplified in FIG. 16B, each one of the reference beams passes through the short and long waveguide elements, 1512 and 1513 respectively, can be split by the respective splitters 1514 and 1515 into two portions for this purpose. First split signal portions of the long and short reference beam arms are passed from the splitters 1515 and 1514 to respective waveguide element 1521 and 1520 can be used for determining the distance between the apparatus 1500 and the target object (not shown) using the techniques disclosed herein (as shown in FIGS. 5 and 6), and the second split portions of the long and short reference beam arms from the splitters 1515 and 1514 can be combined by the combiner 1516 and directed therefrom towards an additional detection unit 1518 configured to generate measurement signals 1519 for monitoring the relative phase (the relative phase between the two delay lines 1520, 1521 can be determined based on the amplitude measured by the detector 1519).

Though apparatus 1500 exemplifies use of two reference delay lines having different lengths, it can be similarly implemented employing any of the other techniques previously described herein involving reference signals.

Figure 17:
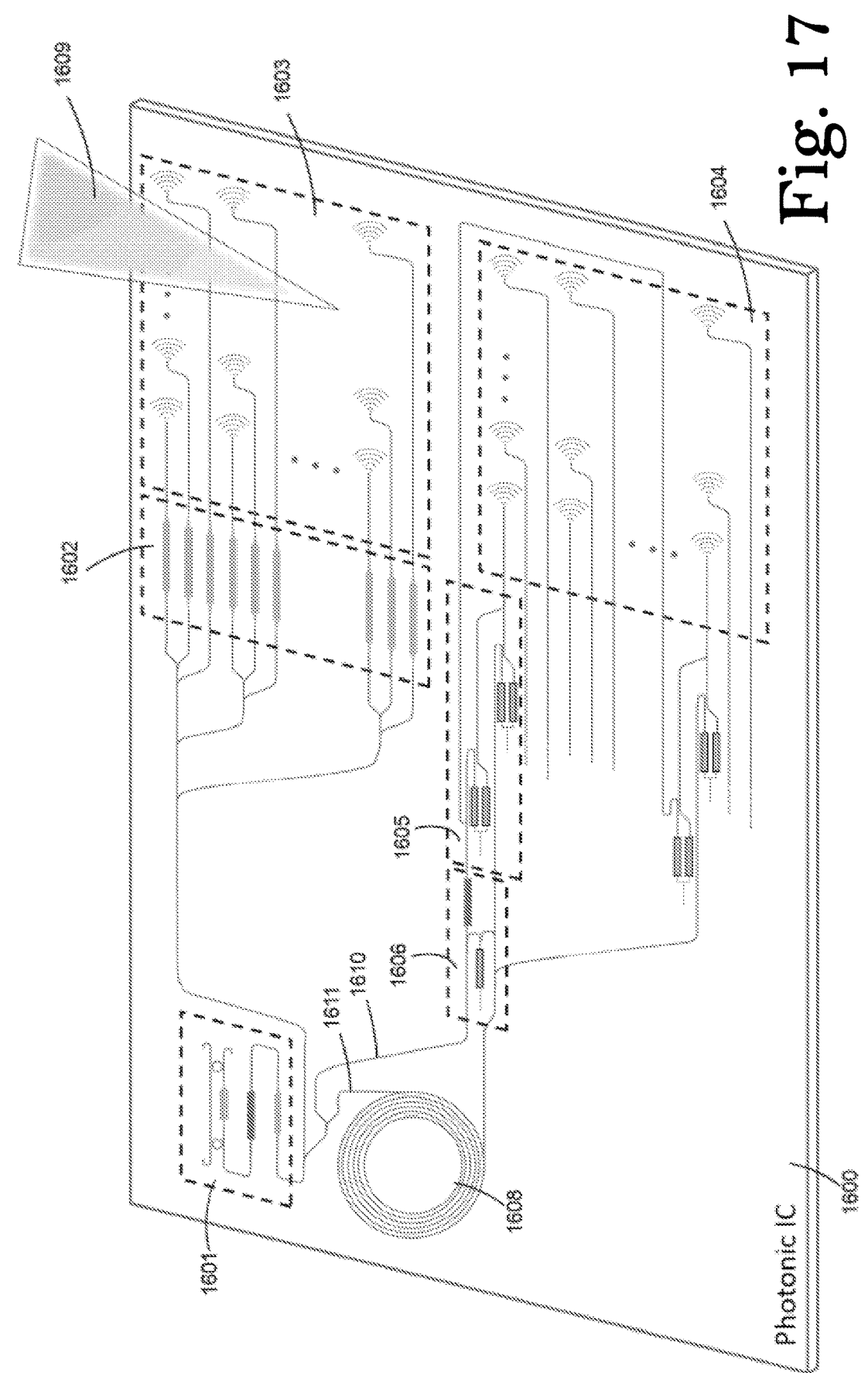
FIG. 17 schematically illustrates a distance measurement/imaging apparatus according to possible embodiments implementation in a photonic integrated circuit (PIC) in a simplified manner e.g., using a hybrid III-V/Silicon platform.

FIG. 17 schematically illustrates a distance measurement/imaging apparatus according to possible embodiments disclosed herein, implemented as a photonic integrated circuit (PIC). The use of a hybrid III-V/Silicon platform in PICs is now commercially available and can be used to implement all of the passive and active components required for implementing the distance measurement/imaging apparatuses disclosed herein. It is noted that the PIC implementation exemplified in FIG. 17 is not limited to III-V platforms, as it can be similarly implemented in any other suitable material platform.

The PIC's chip 1600 can be formed/patterned on, but not limited to, Silicon on Isolator (SOI) platform, or a Silicon Nitride (SNi) substrate. A narrow-linewidth laser module with a phase modulator for coherent length control and amplifier 1601 is used as a light signal source which is split into two portions. The first portion is guided into the amplifiers array 1602 and therefrom transmitted through the free space medium by the transmitters array 1603. The transmitted interrogating beam 1609 is directed by the transmitters array 1603 towards one or more target objects in the FOV of the apparatus 1600. The transmitter elements of the array 1603 can be optionally implemented utilizing, but not limited to, etched grating coupler(s). An additional optical component (not shown) can be used in some embodiments to control the transmitted beam 1609, passively or actively.

The second beam portion of the light source 1601, is passed to a short reference arm 1610, and a long reference arm 1611. An additional time delay of the long reference arm is implemented using a delay-line 1608 configured to add an additional length L thereto. Correction unit 1606, for relative phase control, may be used to stabilize the relative phase between the long and short reference lines.

The interrogating beam reflected back from the target objects that corresponds to specific FOV is received by a respective detector that corresponds to the same FOV in the detection array unit 1604. The reflected interrogating beam (not shown) is guided into the unit 1605 wherein the reflected interrogating signal portion is split and superposed with the short and the long reference beam independently on a balanced detector, and the electrical measurement signal from the balanced detector is then analyzed and processed for distance estimation. Additionally, an amplification unit (not shown) can be added also at the receiver detection array unit 1604 in order to increase the SNR. For example, one or more signal amplifiers can be added in some of the waveguide elements (at any location) of the apparatus 1600 for increasing the strength of the signals passed therethrough.

In this specific and non-limiting example, the detection array unit 1604 can be implemented in site, and the received interrogating beam reflected back from the target object does not need to be guided. The fabrication process of the apparatus 1600 may include lithography, e-beam, ion implementation, epitaxial bonding, and/or other methods that can be used for this purpose. In the same manner, this platform can be used for implementing the distance detection/imaging apparatuses disclosed herein on-chip in the RF regime. Additionally, any of the previously described apparatuses illustrated in FIGS. 5 to 14 can be implemented in a similar manner on a PIC's.

It is noted that this distance measurement technique is free of bandwidth (in contrast to all other active remote sensing techniques known to the inventor hereof), and that the long reference arm comprising the delay line e.g., 1608 can have a dual use. Namely, in addition to the use of the long reference arm\delay for distance estimation, it can be also used for measurement of the rotation (angular velocity) of the apparatus i.e., it can act as an optical-gyroscope.

Figure 18:
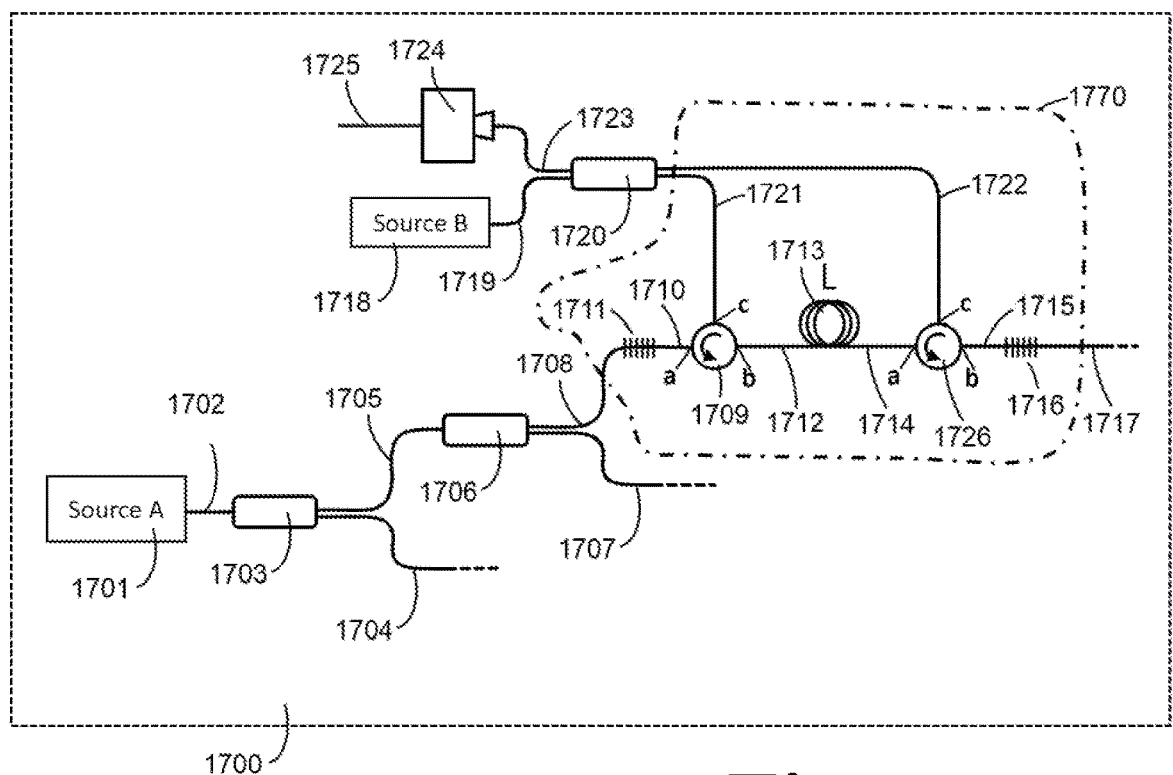
FIG. 18 schematically illustrates rotation measurement apparatus according to some possible embodiments.

In other possible embodiments a rotation measurement apparatus 1700, as illustrated in FIG. 18, is used to measure the rotation of the apparatus, and thus acts as an optical gyroscope, in addition to the distance detection functionality described herein. Particularly, in apparatus 1700 the long reference arm comprising the delay line 1713 can have a dual use, namely, in addition to the regular use of the long reference arm\delay disclosed herein for distance estimation, it can be also used for measuring angular velocity of the apparatus.

In apparatus 1700 the electromagnetic signal source (A) 1701 is configured to generate a beam having a finite coherence length for passage through a waveguide element 1702. In some possible embodiments the waveguide elements shown in FIG. 18 can be implemented by optical fibers. The electromagnetic beam passing through the waveguide element 1702 is split by the beam splitter 1703 into two portions: an interrogating beam portion passed through waveguide element 1704; and a reference beam portion passed through the waveguide element 1705. The interrogating beam portion propagates towards the target object (not shown). The reference beam portion passing through the waveguide element 1705 is split by the beam splitter 1706 into two reference signal portions; the first reference beam portion is passed through the waveguide element 1707

(used as a short reference arm for source (A) 1701); and a second reference beam portion passed through the waveguide element 1708 (used as a long reference arm for source (A) 1701). The second reference beam portion passed through the waveguide element 1708 is directed and passed through the FBGA element 1711 (that acts as a transparent waveguide only for signal source (A) 1701). The second reference beam portion passed through the FBGA element 1711, and thereafter through the waveguide element 1710, is directed towards three-port circulator element 1709.

The second reference beam portion from the waveguide element 1710 is introduced via the first port a into the circulator element 1709, which permits passage thereof only through its second port b i.e., passage thereof from port a to port c is substantially prevented.

The second reference beam portion passing through the waveguide element 1712 is time delayed by an additional distance L affected by the waveguide element 1713 configured to introduce the additional time delay to the second reference beam. The time delayed second reference beam portion passed from the waveguide element 1713 through the waveguide element 1714 is passed through an additional three-port circulator element 1726. The additional three-port circulator element 1726 is configured to permit passage of the delayed second reference beam portion introduced thereinto via its first port a only through its second port b, that is coupled to the waveguide element 1715 i.e., passage thereof from port a to port c is substantially prevented. The delayed second reference beam portion passed through the circulator element 1726 is passed through the waveguide element 1715 and the FBGA element 1716 (that acts as a transparent waveguide only for signal source (A) 1701). The delayed second reference beam portion passed through the waveguide element 1717 is used as a long delay reference signal for distance detection employing any of the techniques/ apparatuses described herein.

The second electromagnetic source signal (B) 1718, the detector 1724, and the ring interferometer 1770 formed by the waveguide element 1721, FBGA element 1711, waveguide element 1710, circulator 1709, waveguide element 1712, delay line 1713, waveguide element 1714, circulator 1726, waveguide element 1715, FB GA element 1716, and the waveguide element 1722, can be used to detect "Sagnac interference" effect usable for angular velocity measurements.

In apparatus 1700 the second electromagnetic signal source (B) 1718 is configured to generate a beam, passing through a waveguide element 1719. The electromagnetic beam passing through the waveguide element 1719 is split by the beam splitter 1720 into first and second interference beam portions that are passed through waveguide elements 1721, and 1722 respectively. The first interference beam portion passed through the waveguide element 1721 is introduced via the third port c into the circulator element 1709, which permits passage thereof only through its first port a i.e., passage thereof from port c to port b is substantially prevented. The first interference beam portion is passed from the first port a of the circulator element 1709 into the waveguide element 1710.

The first interference beam portion passed through waveguide element 1710 is backreflected by the FBGA element 1711 which acts as a mirror only for the signal source (B) 1718. The first interference beam portion reflected by the FBGA element 1711, propagates backwards through the waveguide element 1710 towards the three-port circulator element 1709, and introduced thereinto via the first port a of the circulator element 1709.

The first interference beam portion is passed from the second port b of the circulator element 1709 into the waveguide element 1712.

The first interference beam portion passing through the waveguide element 1712 is delayed by an additional distance L affected by the waveguide element 1713 configured to introduce the additional time delay to the first interference beam. After passage through the waveguide element 1713, the first delayed interference beam portion is passed through the waveguide element 1714 into the first port a of the additional three-port circulator element 1726. The additional circulator element 1726 is configured to permit passage of the first delayed interference beam portion introduced thereinto via its first port a only through its second port b, that is coupled to the waveguide element 1715 i.e., the passage from port a to port c is substantially prevented.

The first delayed interference beam portion passed through waveguide element 1715 coupled to the second port b of the circulator element 1726 is backreflected by the second FBGA element 1716, which acts as a mirror only for signal source (B) 1718. The first delayed interference beam portion reflected by the FB GA element 1716 through the waveguide element 1715 propagates backwards into the second port b of the three-port circulator element 1726. The circulator element 1726 is configured to permit passage of the first delayed reference beam portion received via its second port b through its third port c, into the waveguide element 1722, while substantially preventing passage thereof via its first port a.

The first delayed interference beam portion is passed from the third port c of the three-port circulator element 1726 into the waveguide element 1722 towards the beam splitter/ combiner 1720.

The second interference beam portion propagates in the waveguide element 1722 and introduced via the third port c into the circulator element 1726, which permits passage thereof only through its first port a i.e., the passage from port c to port b is substantially prevented.

The second interference beam portion is passed from the first port a of the circulator element 1726 into the waveguide element 1714.

The second interference beam portion passing through the waveguide element 1714 is delayed by an additional distance L obtained by the waveguide element 1713 configured to introduce the additional time delay to the second interference beam. After passage through the waveguide element 1713, the second delayed interference beam portion is passed through the waveguide element 1712 into the second port b of the three-port circulator element 1709. The circulator element 1709 is configured to permit passage of the second delayed interference beam portion introduced thereinto via its second port b only through its third port c, that is coupled to the waveguide element 1721 i.e., the passage from port b to port a is substantially prevented.

The second delay interference beam portion propagates in the waveguide 1721 towards the beam splitter/combiner 1720.

The first and second delayed interference beam portions that propagates backwardly in the waveguides 1722 and 1721 are superposed by the beam splitter/combiner 1720, wherefrom the superposed signal propagates through the waveguide element 1723 towards the detector 1724. The superposed signal is projected onto the detector 1724, to thereby generate the measured signal 1725.

The measured signal 1725 can be analyzed in the frequency domain and the detected angular velocity $\omega$ is related to the rotation angle $\Delta\varphi$ indicative by the Sagnac effect, which can be expressed as follows:

$$\Delta\varphi \approx \frac{8\pi}{\lambda_c}\omega A \qquad (14)$$

where $\lambda_c$ is the central wavelength of the electromagnetic signal source (B) 1718, and where, A represent the effective area (given by: A=Na, where a is the area within the delay line 1713 and N is the number of windings of the delay line 1713).

The equations mentioned hereinabove (for distance measurement) are particularly usable for beam sources having Gaussian spectrums. In other cases, these equations can take a different form, but the same distance determination principles are substantially maintained.

The embodiments disclosed herein provide some examples of implementations, but they can be used partially, or with other components for other embodiments. Furthermore, the core basis of the subject matter disclosed herein is the measurement and distance/imaging techniques which can be widely used in many applications, and which can be implemented by a variety of hardware components and analyzed by different methods of signal processing.

It is noted that though the array detection configurations are exemplified and illustrated utilizing a one-dimensional (1D) array for simplicity, but in a similar manner they can be implemented by a two-dimensional (2D) array.

It is further noted that in possible embodiments disclosed herein the coherence length of the electromagnetic signal source can be controlled by an external unit/device.

As will be appreciated by those skilled in the art, the embodiments disclosed herein enable to detect signals of considerably low magnitudes due to the coherent detection techniques employed. Furthermore, by increasing the power of the reference arm signal, the power of the signals that can be detected using the disclosed embodiments is very low (even a single photon can be detected), by this method noted as heterodyne detection. With these techniques the velocity of the target object can be also detected due to the beating frequency of the returned signal and the reference signal by utilizing the Doppler effect. These techniques can be also used for cross-section analyses and not only for distance measurement.

In contrast to the techniques of the prior art mentioned in the background section e.g., ToF, FMCW and OCT, with the techniques of this application the accuracy of the distance measurement is not time-dependent or bandwidth-dependent, but rather depends on the coherence stability of the electromagnetic signal source, and the ability to measure the $\Gamma$ parameter with high precision. In addition, the techniques disclosed herein offers inherent noise filtering via coherent detection. By combining these properties, lower signals can be detected, and the SNR can be improved significantly at a low cost.

In some of the configurations disclosed herein, polarized beams can be used, and polarizing beam splitters, for advanced designs.

As described hereinabove and shown in the associated figures the present invention provides implementations for distance measurement/imaging and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A system for measuring a distance to a target object comprising at least one light source configured to provide an illumination beam of a selected wavelength range and a defined coherence length, an optical arrangement, and a detection arrangement comprising at least one detector unit, said optical arrangement comprises optical elements forming at least first and second interferometers, each of said first and second interferometers is formed of a reference path and an interrogating path, said interrogating path comprises optical arrangement adapted to direct interrogating beam portions of said illumination beam toward a target object and collect return beam portions reflected from said target object, wherein the interrogating beam portions of the interrogating paths of the first and second interferometers spatially overlap at least at a point of impinging on the target object such that the first and second detected signals correspond to interference signals formed using light reflected from a common location on the target object; said reference path and interrogating path generate an interference signal on at least one detector of the detection arrangement, thereby generating detection data comprising at least first and second detected signals indicative of interference signal of said first and second interferometers;

wherein said first and second interferometers are configured with respective first and second different coherence factors being associated with at least one of optical path of reference paths of the first and second interferometers, and coherence length of light passing in said first and second interferometers;

wherein said at least one light source comprises at least one laser unit configured to emit the illumination beam having the defined coherence length and a fixed instantaneous frequency, wherein the illumination beam being provided as a continuous-wave (CW) or a pulsed beam;

and wherein the system is configured to determine a coherence ratio term being a ratio between said at least first and second detected signals and uses said coherence ratio term to determine a distance to said target object.

2. The system of claim 1, wherein interrogating paths of said least first and second interferometers being at least partially overlapping.

3. The system of claim 2, wherein said at least partially overlapping portion of said interrogating paths further comprises a circulator configured to receive the interrogating signal in a first port thereof and direct it towards the target object via a second port thereof and receive the at least one return signal via said second port and direct it towards the detection arrangement via a third port thereof.

4. The system of claim 1, further comprising a controller-comprising one or more processors and memories configured for receiving and processing said detection data and to determine said coherence ration term, and to utilizes said coherence ratio term and determined a distance of said target.

5. The system of claim 1, wherein said optical arrangement comprises optical fibers or waveguides.

6. The system of claim 1, wherein said detection arrangement comprises at least two detector arrays, said interrogating paths is configured for illuminating a field of view and for collecting light reflected from said field of view to form image data on detection plane of said detection unit, thereby enabling detection of distance map of said field of view.

7. The system of claim 1, wherein said detection arrangement is configured to provide balanced detection of said interference signal, said at least one detector unit comprises respective one or more additional detector units, thereby enhancing signal to noise ratio and filtering out at least one of background noise and distance independent components from the measurement data.

8. The system of claim 1, wherein said light source comprises at least one broadband light source.

9. The system of claim 1, wherein said light source is adapted to emit light of at least first and second wavelength ranges to propagate in corresponding said at least first and second interferometers.

10. The system of claim 9, wherein said light source is adapted for sequentially emit light of said first and second wavelength ranges, and wherein said first and second wavelength ranges are associated with corresponding first and second different linewidths, thereby affecting coherence length of light of said first and second wavelength ranges.

11. The system of claim 1, wherein said at least first and second interferometers are overlapping along interrogating path and at least a portion of reference paths.

12. The system of claim 11, wherein said at least portion of overlapping reference path overlapping between said at least first and second interferometers, comprise one or more wavelength selective delay lines thereby differentiating optical path of light portions of at least first and second wavelength ranges.

13. The system of claim 12, wherein said at least portion of overlapping reference path comprises one or more fiber Bragg grating array (FBGA) elements configured to reflect selected one or more wavelength ranges, thereby varying optical path of said one or more wavelength selective delay lines.

14. The system of claim 1, formed within a photonic integrated circuit.

15. The system of claim 1, wherein the illumination beam has a Gaussian spectrum, and wherein the coherence ratio term is determined by $$\Gamma \triangleq \frac{Coh(I_{long})}{Coh(I_{short})} = \chi_{eff} \cdot \frac{e^{-\frac{\Delta k^2}{8}(\Delta x - L)^2}}{e^{-\frac{\Delta k^2}{8}(\Delta x)^2}} = \chi_{eff} \cdot e^{\frac{\Delta k^2 L}{4}[\Delta x - \frac{L}{2}]}$$

where $\chi_{eff}$ represents the constants parameters of the coherence terms, L is the half of the OPD between the long and short reference arms, $\Delta k$ is the bandwidth of the illumination beam, and $\Delta x = x - x_0$ is the distance between the system and the target object.

16. A method for determining distance to a target, the method comprising:

Generating, by at least one light source, at least one electromagnetic beam having a defined coherence length and a selected fixed instantaneous wavelength, wherein the electromagnetic beam being emitted as a continuous-wave (CW) or as a pulsed beam;

directing a first reference portion of the beam along a first reference path having first length;

directing a second reference portion of the beam along a second reference path having a second length different than the first length; and directing a third portion of the beam toward the target;

collecting reflection of said third portion from a common location on the target;

combining a first portion of collected reflected radiation from said location with said first reference portion to form a first interfered combined signal and a second portion of the collected radiation from said location with said second reference portion to form a second interfered combined signal and detecting intensity of said first and second interfered combined signals to generate corresponding first and second detected signals; and processing said first and second detected signals and determining a coherence ratio term and using said coherence ratio term data on distance of said location on the target.

* * * * *